(12) United States Patent
Song et al.

(10) Patent No.: US 10,902,402 B2
(45) Date of Patent: Jan. 26, 2021

(54) PORTABLE DEVICE AND ELECTRONIC PAYMENT METHOD OF PORTABLE DEVICE

(71) Applicant: SAMSUNG ELECTRONICS CO., LTD., Suwon-si (KR)

(72) Inventors: Hyeseon Song, Seoul (KR); Nalin Chakoo, Suwon-si (KR); Chaekyung Shin, Suwon-si (KR); Seungdoo Choi, Anyang-si (KR); Young-Kyoo Kim, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 204 days.

(21) Appl. No.: 15/479,486

(22) Filed: Apr. 5, 2017

(65) Prior Publication Data

US 2017/0293909 A1    Oct. 12, 2017

(30) Foreign Application Priority Data

Apr. 8, 2016    (KR) ........................ 10-2016-0043165

(51) Int. Cl.
*G06Q 20/32*    (2012.01)
*G06Q 20/40*    (2012.01)

(52) U.S. Cl.
CPC ......... *G06Q 20/322* (2013.01); *G06Q 20/405* (2013.01)

(58) Field of Classification Search
CPC ........................... G06Q 20/322; G06Q 20/405
USPC ........................................................ 705/44
See application file for complete search history.

(56) References Cited

U.S. PATENT DOCUMENTS

| 6,343,279 | B1 * | 1/2002 | Bissonette | G06Q 20/10 235/380 |
| 6,830,179 | B2 * | 12/2004 | Korhonen | G06Q 20/04 235/375 |
| 7,954,706 | B2 * | 6/2011 | Calabrese | G06Q 20/325 235/380 |

(Continued)

FOREIGN PATENT DOCUMENTS

| KR | 10-2005-0049217 | 5/2005 |
| KR | 10-2005-0095266 | 8/2005 |

OTHER PUBLICATIONS

Biersdorfer, J.D., "Q & A; A Wealth of Information Inside a Magnetic Strip," The New York Times, Jan. 17, 2002. https://www.nytimes.com/2002/01/17/technology/q-a-a-wealth-of-information-inside-a-magnetic-strip.html (Year: 2002).*

(Continued)

*Primary Examiner* — Scott S Trotter
(74) *Attorney, Agent, or Firm* — Nixon & Vanderhye, P.C.

(57) ABSTRACT

A portable device and an electronic payment method of a portable device are provided. For example, a portable device and an electronic payment method of a portable device capable of performing a payment by an electronic card having a card payment limit for each category of products (or services) are provided. Various example embodiments provide a portable device and an electronic payment method of a portable device capable of providing a user with a payment processing notification and a payment holding notification by an electronic card having a card payment limit for each category of one or more purchase categories before the payment is completed.

14 Claims, 11 Drawing Sheets

(56) References Cited

U.S. PATENT DOCUMENTS

| | | | | |
|---|---|---|---|---|
| 8,622,309 | B1* | 1/2014 | Mullen | G06Q 20/347 |
| | | | | 235/492 |
| 2009/0037326 | A1* | 2/2009 | Chitti | G06Q 20/10 |
| | | | | 705/39 |
| 2011/0010254 | A1* | 1/2011 | Chenot | G06Q 20/204 |
| | | | | 705/17 |
| 2013/0024364 | A1 | 1/2013 | Srivastava et al. | |
| 2013/0185206 | A1* | 7/2013 | Leggett | G06Q 20/32 |
| | | | | 705/44 |
| 2014/0195422 | A1 | 7/2014 | Zheng et al. | |
| 2014/0195424 | A1 | 7/2014 | Zheng et al. | |
| 2014/0244503 | A1* | 8/2014 | Sadlier | G06Q 20/40 |
| | | | | 705/44 |
| 2014/0246490 | A1 | 9/2014 | Graylin | |
| 2015/0178862 | A1 | 6/2015 | Angrish et al. | |
| 2015/0371234 | A1 | 12/2015 | Huang et al. | |
| 2016/0180339 | A1* | 6/2016 | Zhao | G06Q 20/405 |
| | | | | 705/44 |
| 2016/0379101 | A1* | 12/2016 | Hammad | G06K 19/06206 |
| | | | | 235/380 |
| 2017/0061433 | A1* | 3/2017 | Kulshreshtha | G06Q 20/405 |
| 2017/0193504 | A1* | 7/2017 | Godsey | G06Q 20/405 |

OTHER PUBLICATIONS

Search Report and Written Opinion dated Jul. 20, 2017 in counterpart International Patent Application No. PCT/KR2017/003765.
Extended Search Report dated Mar. 7, 2019 in counterpart European Patent Application No. EP17779363.5.
Communication pursuant to Article 94(3) EPC dated Jul. 13, 2020 in European Patent Application No. 17779363.5.

* cited by examiner (c)

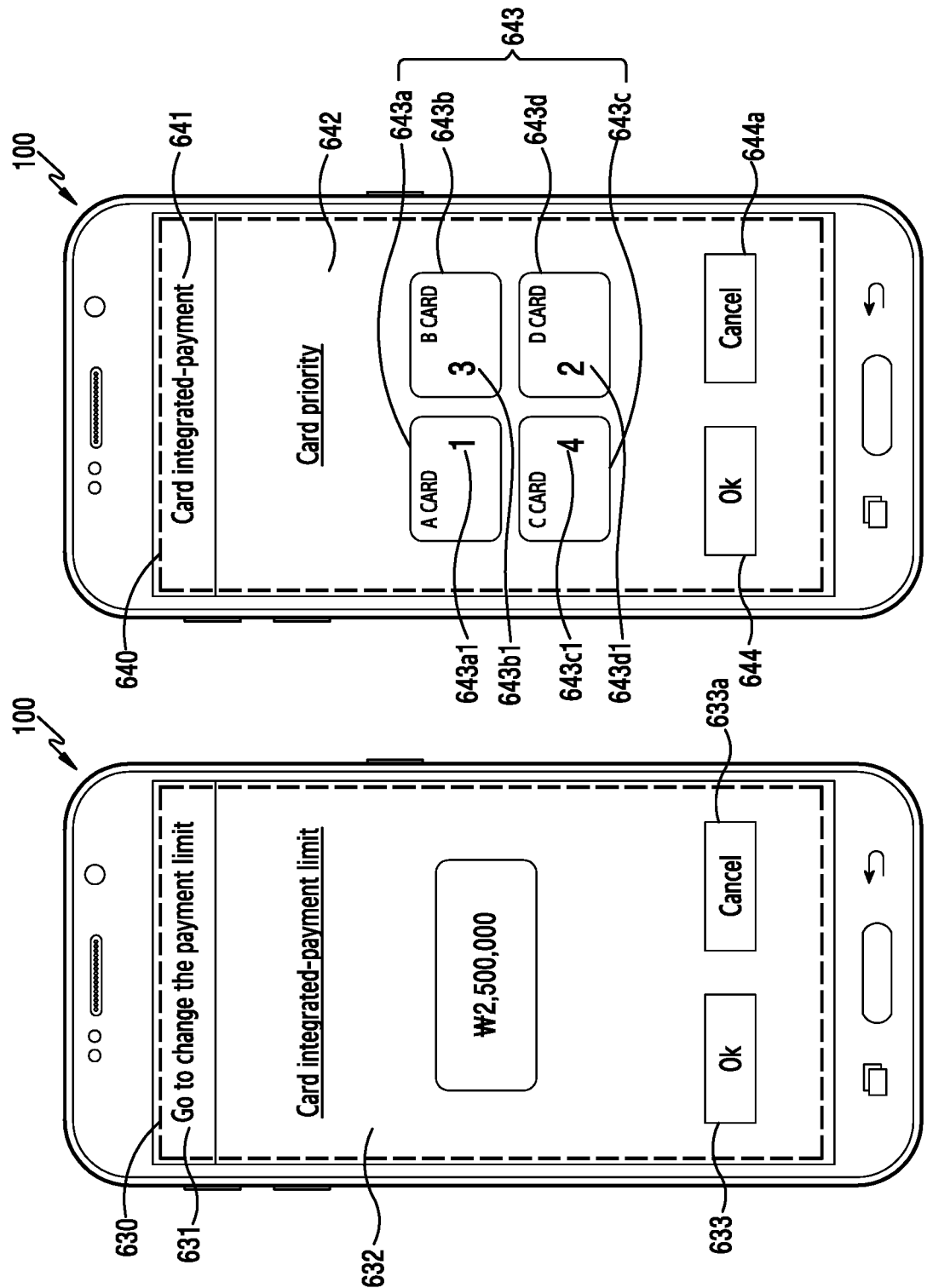

PORTABLE DEVICE AND ELECTRONIC PAYMENT METHOD OF PORTABLE DEVICE

CROSS-REFERENCE TO RELATED APPLICATION

This application is based on and claims priority under 35 U.S.C. § 119 to Korean Application Serial No. 10-2016-0043165, which was filed in the Korean Intellectual Property Office on Apr. 8, 2016, the content of which is incorporated by reference herein in its entirety.

TECHNICAL FIELD

The present disclosure relates generally to a portable device and an electronic payment method of a portable device and, for example, to a portable device and an electronic payment method of a portable device capable of collectively identifying payment details of all electronic cards possessed by a user.

BACKGROUND

Due to the development of technologies, portable devices provide various services and functions such as multitasking or an electronic payment including a mobile payment as well as a phone call and data transmission.

When a product (or a service) is purchased in an online shop (or an offline shop), a user may pay for the product through one of a real credit card (or a cash card) and electronic cards (or application cards) registered in an electronic payment service (or a payment application) supported by the portable device. When the user pays by the electronic card, the user can know payment details corresponding to the payment card through at least one of a receipt and notification (for example, an SMS, an MMS, or payment application notification) after the payment is completed.

SUMMARY

Various example embodiments may provide a portable device and an electronic payment method of a portable device capable of setting a payment limit for each category of products (or services) in one electronic device possessed by a user.

Various example embodiments may provide a portable device and an electronic payment method of a portable device capable of providing the user with a notification corresponding to a payment limit excess generated in a category having a payment limit in one electronic card possessed by the user.

Various example embodiments may provide a portable device and an electronic payment method of a portable device capable of collectively identifying and managing payment details of all electronic cards that are possessed by the user and have priorities set therein.

Various example embodiments may provide a portable device and an electronic payment method of a portable device capable of collectively identifying and managing payment details of all electronic cards possessed by the user.

A method of performing an electronic payment by a portable device according to an example embodiment of the present disclosure includes: executing a payment application including an electronic card having payment limit information in a portable device; transmitting electronic card information corresponding to the electronic card to the outside through wireless communication to pay for an item to be purchased; receiving advance payment information from the outside; and determining whether to pay for the item based on the advance payment information and the payment limit information, wherein the payment limit information includes a payment limit amount for each category.

In accordance with an example aspect of the present disclosure, the method of performing the electronic payment by the portable device may further include setting the payment limit information and notification setting information corresponding to payment limit excess through the payment application.

In accordance with an example aspect of the present disclosure, the method of performing the electronic payment by the portable device may further include, when the payment limit of the category is exceeded based on the advance payment information and the payment limit information, displaying at least one of a payment limit notification and a payment holding notification.

In accordance with an example aspect of the present disclosure, the payment limit information may be set in all electronic cards possessed by the user.

In accordance with an example aspect of the present disclosure, the payment limit information may be set in each category of all electronic cards possessed by the user.

In accordance with an example aspect of the present disclosure, priorities may be set for all electronic cards.

A method of performing an electronic payment by a portable device according to an example embodiment of the present disclosure includes: executing a payment application for performing an electronic payment through a processor in a portable device including a communication unit and a processor; comparing a category of the item, payment limit information of the category, and an accumulated payment amount of the category based on the advance payment information through the processor; and performing at least one of payment approval and payment holding based on the payment limit information and the accumulated payment amount through the processor.

A portable device according to an example embodiment of the present disclosure includes: a communication unit comprising communication circuitry; and a processor configured to control the communication unit, wherein the processor is configured to execute a payment application including an electronic card having payment limit information, to transmit electronic card information corresponding to the electronic card to the outside through the communication unit to pay for an item to be purchased, and to determine whether to pay for the item based on advance payment information received through the communication unit and the payment limit information, and the payment limit information includes a payment limit amount for each category.

BRIEF DESCRIPTION OF THE DRAWINGS

The above and other aspects, features, and attendant advantages of the present disclosure will be more apparent and readily appreciated from the following detailed description, taken in conjunction with the accompanying drawings, in which like reference numerals refer to like elements, and wherein:

FIGS. 8A and 8B are diagrams illustrating an example of card integrated payment settings in the portable device according to another example embodiment of the present disclosure.

DETAILED DESCRIPTION

Figure 1:
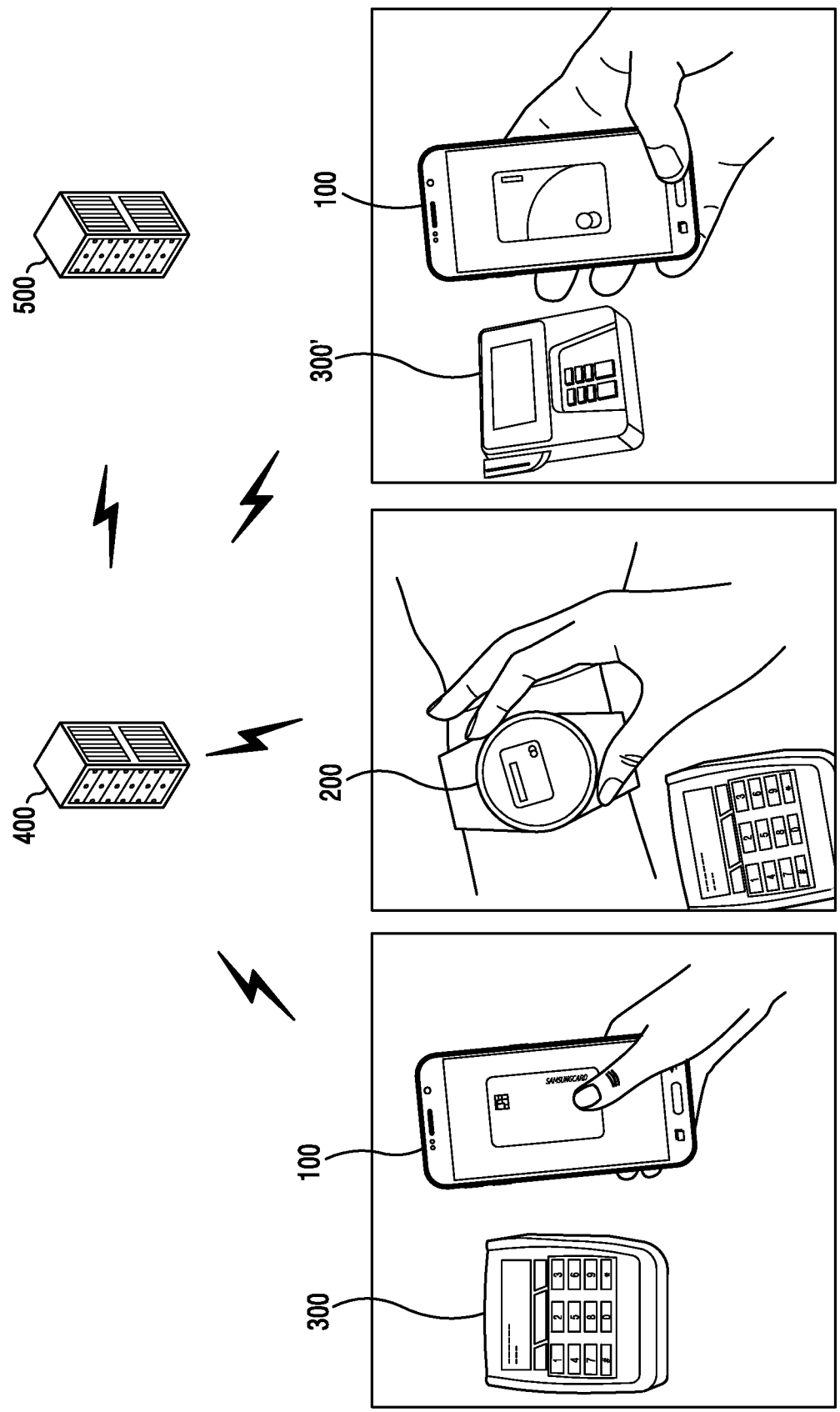
FIG. 1 is a diagram illustrating an example portable device, card payment terminal, payment server, and token server according to an example embodiment of the present disclosure.

Hereinafter, various example embodiments of the present disclosure will be described with reference to the accompanying drawings. Further, the methods of manufacturing and using the present disclosure will be described in greater detail with reference to accompanying drawings. The same reference numerals or the signs represented in each of the drawings indicate the elements or the components that perform substantially the same functions.

Ordinal terms such as "first" and "second" may be used to describe various elements, but these elements are not limited by the terms. The above terms may be used to distinguish one element from another element. For example, a first element may be named a second element in the scope of protection of the present disclosure. Further, a second element may also be named a first element. As used herein, the term "and/or" includes any and all combinations of one or more disclosed items.

An application may, for example, refer to software which is executed on an Operating System (OS) for a computer or a mobile OS and is used by a user. For example, the application may include a web browser, a mobile payment application (or an electronic payment application or a payment application), a photo album application, a word processor, a spread sheet, a contacts application, a calendar application, a memo application, an alarm application, a Social Network System (SNS) application, a game store, a chatting application, a map application, a music player, and a video player, or the like, but is not limited thereto.

The application according to an example embodiment of the present disclosure may refer to software executed by a portable device or an external device (for example, a wearable device or a server) connected to the portable device wirelessly or through a wire. Further, the application according to an example embodiment of the present disclosure may refer to software executed by the portable device (e.g., a processor of the portable device) in accordance with a received user input.

A content may be displayed in the executed application. For example, the content may include a video file or an audio file reproduced in the video player corresponding to one of the applications, a music file reproduced in the music player, a photo file displayed in the photo album application, a webpage file displayed in the web browser, or payment information (for example, a mobile card number, an amount to be paid, a product name, a service name, or a shop name) displayed in an electronic payment application, or the like, but is not limited thereto. Further, the payment information may include encrypted one time token information.

The content may include a video file, an audio file, a text file, an image file, or a webpage displayed or executed in the application, or the like, but is not limited thereto.

In an example embodiment of the present disclosure, the term "video" may be used interchangeably with a dynamic image. Further, the content may include a video file, an audio file, a text file, an image file, or a webpage executed according to a received user input.

The content may include an executed application screen and a user interface that includes the application screen. Further, the content may include one content or a plurality of contents.

A widget may refer, for example, to a mini application, which is one of the Graphic User Interfaces (GUIs) that more smoothly support an interaction between the user and the application or OS. For example, the widget may include a weather widget, a calculator widget, and a clock widget.

According to an example embodiment of the present disclosure, the "user input" may include, for example, a button (or key) selection by the user, a button (or key) press by the user, a button (or key) touch by the user, a user's touch (including a non-contact such as hovering) on the touch screen, a user's touch gesture (including a non-contact such as hovering) on the touch screen, a user's voice, a user's presence (for example, a user's presence within a camera recognition range) or a user's motion, or the like, but is not limited thereto. Further, the "button (or key) selection" may refer to a button (or key) press or a button (or key) touch.

In the present disclosure, the terms are used to describe an example embodiment, and are not intended to limit and/or restrict the present disclosure. As used herein, the singular forms are intended to include the plural forms as well, unless the context clearly indicates otherwise. In the description, it should be understood that the terms "include" or "have" indicate existence of a feature, a number, a step, an operation, a structural element, parts, or a combination thereof, and do not previously exclude the existences or probability of addition of one or more other features, numeral, steps, operations, structural elements, parts, or combinations thereof. The same reference numerals represented in each of the drawings indicate the elements that perform substantially the same functions.

FIG. 1 is a diagram illustrating an example portable device, payment server, and token server according to an example embodiment of the present disclosure.

Referring to FIG. 1, in a mobile payment service (or an electronic payment service), a portable device 100 capable of executing a payment application (for example, Samsung Pay™ application) and a wearable device 200 (or another portable device) linked with the portable device 100 capable of executing the payment application may be functionally connected to a payment server 400. Further, the wearable device 200 capable of executing a payment application separately installed from the portable device 100 may be functionally connected to the payment server 400. The payment server 400 may be functionally connected to a token server 500.

According to an example embodiment of the present disclosure, the portable device may refer to a device (for example, a portable device or a wearable device) possessed by the same user who can use the payment application. The portable device 100 and the wearable device 200 may be possessed by the same owner (not shown).

The payment application executed in the portable devices 100 and 200 provides a user interface and a user experience corresponding to the electronic payment. The user may provide a user interface corresponding to registering one or a plurality of electronic cards through the payment application, setting a priority to first use one of the plurality of electronic cards for payment (by default), setting a payment limit of a set period (for example, day, week, month, quarter, or year), or setting a notification type according to excesses of the payment limit.

The portable device 100 or 200 may have information on a card company or a financial company having issued the electronic card (or application card).

The electronic payment service may include the portable device 100, the portable device 200, a card payment terminal (card terminal or Point Of Sales (POS) terminal) 300 or 300', the payment server 400, or the token server 500. Further, the electronic payment service may further include a financial server (not shown), a payment network (not shown), or a purchase server (not shown).

At least one of the portable devices 100 and 200 may be connected to the payment server 400 through the payment application. At least one of the portable devices 100 and 200 may perform an electronic payment through the payment application. At least one of the portable devices 100 and 200 may perform the electronic payment through the card payment terminal 300 or 300' in a contact (or non-contact) manner.

The payment server 400 may manage the electronic payment service performed by the payment application. The payment server 400 may transmit payment-related information (or advance payment information) received from the portable device 100 or 200 to the outside or directly process the payment-related information. Further, the payment server 400 may transmit payment-related information (or advance payment information) received from the outside (for example, a payment network (not shown)) to the portable device 100 or 200 or directly process the payment-related information. In addition, the payment server 400 may relay payment authentication information corresponding to one of the payment-related information.

The payment server 400 may mange an electronic payment service account (for example, Samsung account), Device Unique Identifications (DUIDs) of the portable devices 100 and 200, and/or card information (for example, a card name, a card number, an expiration date, and used card information) corresponding to a user who uses one or a plurality of cards in the electronic payment service account.

The payment server 400 may be wirelessly connected to the portable devices 100 and 200. Further, the payment server 400 may be connected to the token server 500 through a wire or wirelessly.

The token server 500 may issue (one time issue or issue when the card is registered) and manage a token used in the electronic payment service. The token may replace card unique information (e.g., Primary Account Number: PAN). The token may be generated based on bank identification information (Bank Identification Number: BIN). The token transmitted from the token server 500 to the payment server 400 may be one of an encryption token (for example, having encryption information) and a non-encryption token (for example, having no encryption information).

The token server 500 may be connected to a financial server (not shown) or a purchase server (not shown) through a wire or wirelessly.

The payment server 400 and the token server 500 may be implemented in an integrated type (for example, the payment server and the token server may be installed in one housing) or in a separated type (for example, the payment server and the token server are installed in separate housings).

The portable device 100 and 200 may be functionally connected to the payment server 400 through the payment application installed therein, respectively. The portable devices 100 and 200 may transmit/receive payment-related information to/from the payment server 400 through the executed payment application. The payment server 400 and the token server 500 functionally connected to the payment server 400 may transmit/receive payment-related information to/from each other.

A financial server (issuer, not shown) may correspond to a bank or a financial company that issues the electronic card (or application card). The financial server (not shown) may perform identification & verification (ID & V) for the electronic card (or application card) and approve of the payment by the electronic card. The financial server (not shown) may serve to finally approve of the payment by the electronic card and receive a payment approval request from the token server (not shown) or the payment server 400.

A purchase server (not shown) may correspond to a bank or a financial company that purchases transaction slips of the electronic card used for the payment in a shop (for example, an offline shop). Further, the purchase server (not shown) may correspond to a bank or a financial company that purchases transaction slips of the electronic card used for the payment in an Internet shop (for example, an online shop).

The purchase server (not shown) may transmit the payment approval request received from the card payment terminal 300 to the financial server (not shown). The purchase server (not shown) may transmit a payment approval result to the card payment terminal 300.

The financial server (not shown) and the purchase server (not shown) may be operated while being integrated or separated.

According to an example embodiment of the present disclosure, the portable device 100 may be a terminal corresponding to an owner of one or a plurality of electronic cards that can be used through the payment application.

The wearable device 200 may be a terminal that can be mounted on/attached to/carried by the owner of one or a plurality of electronic cards and can make a payment by one or the plurality of electronic cards through the payment application. The number of wearable devices 200 may be one or plural. According to an example embodiment of the present disclosure, the portable device may be referred to as including the portable device 100 and the wearable device 200.

The portable devices 100 and 200 may include a mobile phone which can be carried by (mounted on or attached to) a user, a smart phone, a note Personal Computer (PC), a tablet device, an MP3 player, a video player, a camera, or a wearable device, or the like, but is not limited thereto. The wearable device may include an accessory type device (for example, a watch, a ring, or a necklace), a Head-Mounted Device (HMD), a clothing type device (for example, electronic clothing), a body-wearable type device (for example, a skin pad or tattoo), or an implantable circuit, or the like, but is not limited thereto.

The portable devices 100 and 200 may refer to devices that can be carried by (mounted on or attached to) the user and can be executed with an installed payment application. The portable device 100 may refer to a device that can be carried by (mounted on or attached to) the user and can display one or a plurality of electronic cards through a screen of the executed payment application. Further, the portable devices 100 and 200 may refer to devices that can be carried by (mounted on or attached to) the user and can pay for a product (or a service) by one or a plurality of electronic cards through the screen of the executed payment application.

Figure 2:
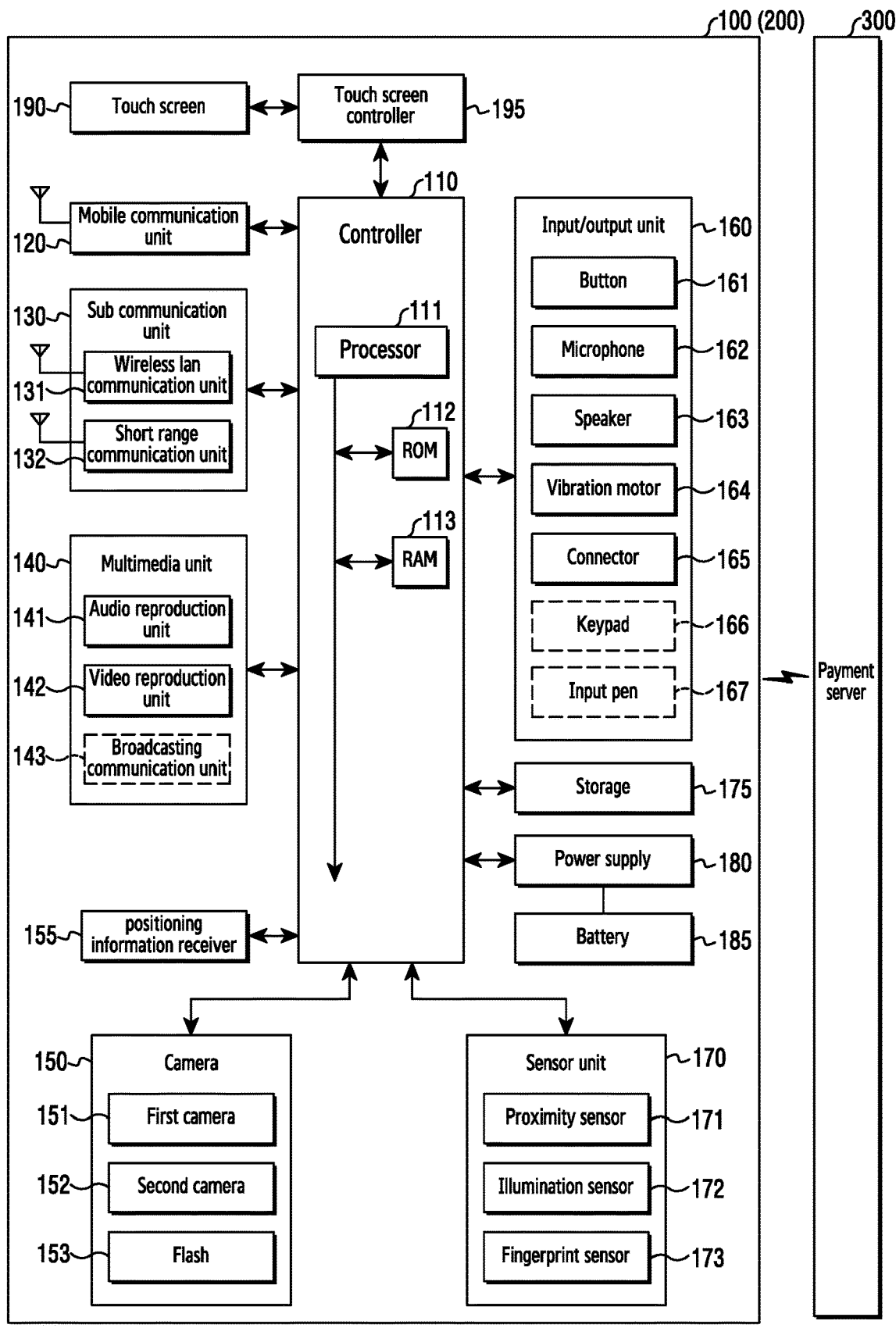
FIG. 2 is a block diagram illustrating an example portable device according to an example embodiment of the present disclosure.

FIG. 2 is a block diagram illustrating an example portable device according to an example embodiment of the present disclosure.

Referring to FIGS. 1 and 2, the portable device 100 may be functionally connected to another device (for example, the portable device 200, the payment server 400, or the card payment terminal 300) wirelessly (or through a wire) or in a non-contact (or contact) type by using at least one of a mobile communication unit (e.g., including communication circuitry) 120, a sub communication unit (e.g., including communication circuitry) 130, and a connector 165.

The portable device 100 may transmit data (for example, corresponding to payment information or advance payment information) to the outside or receive the data from the outside through the communication unit 120 or 130 by means of a touch screen 190. The portable device 100 may transmit data (for example, corresponding to payment information or advance payment information) to the outside or receive the data from the outside through the communication unit 120 or 130 by means of an input pen 167 and the touch screen 190.

The portable device 100 may transmit data (for example, corresponding to payment information or advance payment information) to the outside or receive the data from the outside based on a user input (for example, selection of an electronic card or a change of an electronic card) made on the touch screen 190.

The portable device 100 includes a controller 110 (for example, a processor including a processing circuitry), the mobile communication unit 120, the sub communication unit 130, a multimedia unit (e.g., including multimedia circuitry) 140, a camera 150, positioning information receiver 155, an input/output unit (e.g., including input/output circuitry) 160, a sensor unit (e.g., including one or more sensors) 170, a storage 175, and a power supply 180. Further, the portable device 100 includes the touch screen 190 and a touch screen controller 195.

The controller 110 may include a processor 111. The controller 110 may further include a Read Only Memory (ROM) 112 which stores a control program for a control of the portable device 100, and a Random Access Memory (RAM) 113 which stores signals or data input from the outside of the portable device 100, or is used as a storage region for various tasks performed by the portable device 100. The controller 110 may include a separate storage area (for example, a trust zone) that can store a token (including a token ID, a token value, or a token state) related to security of the electronic payment. The trust zone may be included in, for example, a Rich Execution Environment (REE) or a Trusted Execution Environment (TEE).

The controller 110 performs a function of controlling the general operation of the portable device 100 and a signal flow between internal elements 120 to 195 and processing data. The controller 110 may control power supply to the internal elements 120 to 195 using the power supply 180.

The processor 111 may include various processing circuitry and a Graphic Processing Unit (GPU) (not shown) for graphic processing. Further, the processor 111 may further include a sensor processor (not shown) for controlling a sensor or a communication processor (not shown) for controlling communication.

The processor 111 may be implemented in a System on Chip (SoC) form including a core (not shown) and the GPU (not shown). The processor 111 may include a single core, a dual core, a triple core, a quadruple core, and a core of a multiple thereof.

The processor 111, the ROM 112, and the RAM 113 may be connected with each other through buses.

The controller 110 may control the mobile communication unit 120, the sub communication unit 130, the multimedia unit 140, the camera 150, the positioning information receiver 155, the input/output unit 160, the sensor unit 170, the storage 175, the power supply 180, the touch screen 190, and the touch screen controller 195.

According to an example embodiment of the present disclosure, the term "controller of the portable device" may include the processor 111, the ROM 112, and the RAM 113.

The mobile communication unit 120 may include various mobile communication circuitry and be connected to another device (for example, the second portable device 200, the payment server 400, or the card payment terminal 300) through a mobile communication network using one or more antennas under a control of the controller 110.

The sub communication unit 130 may include various communication circuitry and be connected to another device (for example, the second portable device 200, the payment server 400, or the card payment terminal 300) through various communication circuitry, such as, for example, and without limitation, a wireless LAN communication unit (e.g., including LAN communication circuitry) 131 and/or a short range communication unit (e.g., including short range communication circuitry) 132 using one or more antennas under a control of the controller 110. The sub communication unit 130 may include an antenna for the wireless LAN, an antenna for Magnetic Secure Transmission (MST) for the electronic payment, or an antenna for Near Field Communication (NFC).

The wireless LAN communication unit 131 may be wirelessly connected to an Access Point (AP) in a place where the AP is installed under a control of the controller 110. The wireless LAN communication unit 131 may support, for example, Wi-Fi communication.

The short range communication may include Bluetooth communication, Bluetooth low energy communication, Infrared Data Association (IrDA), Ultra Wideband (UWB) communication, and MST communication and/or NFC, or the like, but is not limited thereto.

The portable device 100 may include one of the mobile communication unit 120, the wireless LAN communication unit 131, and the short range communication unit 132 or a combination of the mobile communication unit 120, the wireless LAN communication unit 131, and the short range communication unit 132 according to a function and/or performance.

According to various example embodiments of the present disclosure, the term "communication unit" may include the mobile communication unit 120 and/or the sub communication unit 130.

The multimedia unit 140 may include various circuitry for reproduce audio data, reproduce a video, and/or receive an external broadcast under a control of the controller 110.

An audio reproduction unit (e.g., including audio reproduction circuitry) 141 may reproduce an audio source (for example, an audio file including file extensions such as mp3, wma, ogg, or wav) pre-stored in the storage 175 of the portable device 100 or received from the outside using, for example, an audio CODEC under a control of the controller 110.

According to various example embodiments of the present disclosure, the audio reproduction unit 141 may reproduce auditory feedback corresponding to at least one of reception of advance payment information and exceeding the payment limit. For example, the audio reproduction unit 141 may reproduce the auditory feedback (for example, an output of an audio source stored in the storage unit 175) corresponding to at least one of reception of advance payment information and exceeding the payment limit through an audio codec under a control of the controller 110.

A video reproduction unit 142 may include various circuitry for reproducing a digital video source (for example, a video file including file extensions such as mpeg, mpg, mp4, avi, mov, or mkv) pre-stored in the storage unit 175 of the portable device 100 or received from the outside by using the video CODEC under a control of the controller 110.

According to various example embodiments of the present disclosure, the video reproduction unit 142 may reproduce visual feedback corresponding to at least one of reception of advance payment information and exceeding the payment limit. For example, the visual feedback (for example, an output of a video source stored in the storage unit 175) may be reproduced through a video codec under a control of the controller 110.

A broadcasting communication module 143 may include various broadcasting communication circuitry and may receive a broadcasting signal (for example, a TV broadcasting signal, a radio broadcasting signal, or a data broadcasting signal) and broadcasting supplement information (for example, Electronic Program Guide: EPG or Electronic Service Guide: ESG) output from an external broadcasting station through an antenna (not shown) under a control of the controller 110.

The multimedia unit 140 may include the audio reproduction unit 141 and the video reproduction unit 142 except for the broadcasting communication unit 143 in accordance with the performance or structure of the portable device 100. Further, the controller 110 may be implemented to include at least one of the audio reproduction unit 141 and the video reproduction unit 142 of the multimedia unit 140.

The camera 150 may photograph a still image or a video under a control of the controller 110. The camera 150 may include at least one of or both a front first camera 151 and a rear second camera 152. The first camera 151 or the second camera 152 may include an auxiliary light source (for example, a flash 153) providing an amount of light required for photography.

The camera 150 may include the first camera and further include an additional camera (for example, a third camera (not shown)) adjacent to the first camera 151 (for example, an optical axis interval is larger than 5 mm and smaller than 80 mm) on the front surface. Further, the camera 150 may further include the form in which the first camera 151 and the third camera (not shown) are implemented as one unit. The controller 110 may provide control to photograph a three dimensional image or a three dimensional video using the first camera 151 and the third camera (not shown).

The camera 150 may include the second camera 152 and further include an additional camera (for example, a fourth camera (not shown)) adjacent to the second camera 152 (for example, an optical axis interval is larger than 5 mm and smaller than 80 mm) on the rear surface. Further, the camera 150 may further include the form in which the second camera 152 and the fourth camera (not shown) are implemented as one unit. The controller 110 may provide control to photograph a three dimensional still image or a three dimensional video by using the second camera 151 and the fourth camera (not shown).

The camera 151 or 152 may perform wide angle photographing, telephoto photographing, or close-up photographing by using an additional lens (not shown) attachable to/detachable from a separate adaptor (not shown).

The positioning information receiver 155 may periodically receive a signal (for example, orbit information of a GPS satellite, time information of a satellite, and a navigation message) from a plurality of satellites (not shown) on the Earth's orbit.

The portable device 100 may calculate (determine) a location between each satellite (not shown) and the portable device 100 using signals received from a plurality of satellites (not shown) and calculate a distance based on a transmission/reception time difference. A location, time, or movement speed of the portable device 100 may be determined through triangulation. An additional satellite may be required to compensate for the orbit or time.

In the indoor case, the portable device 100 may detect the location or movement speed of the portable device 100 using a wireless AP (not shown). The detection of the location of the portable device 100 indoors may use a cell-ID scheme, an enhanced cell-ID scheme, or an Angle of Arrival (AoA) scheme. Further, the portable device 100 may detect the location or movement speed of the portable device 100 located indoors by using a wireless beacon (not shown).

The input/output unit 160 may include various input/output circuitry, such as, for example, and without limitation, at least one of one or more buttons 161, one or more microphones 162, one or more speakers 163, one or more vibration motors 164, a connector 165, a keypad 166, and the input pen 167.

Figure 6A:
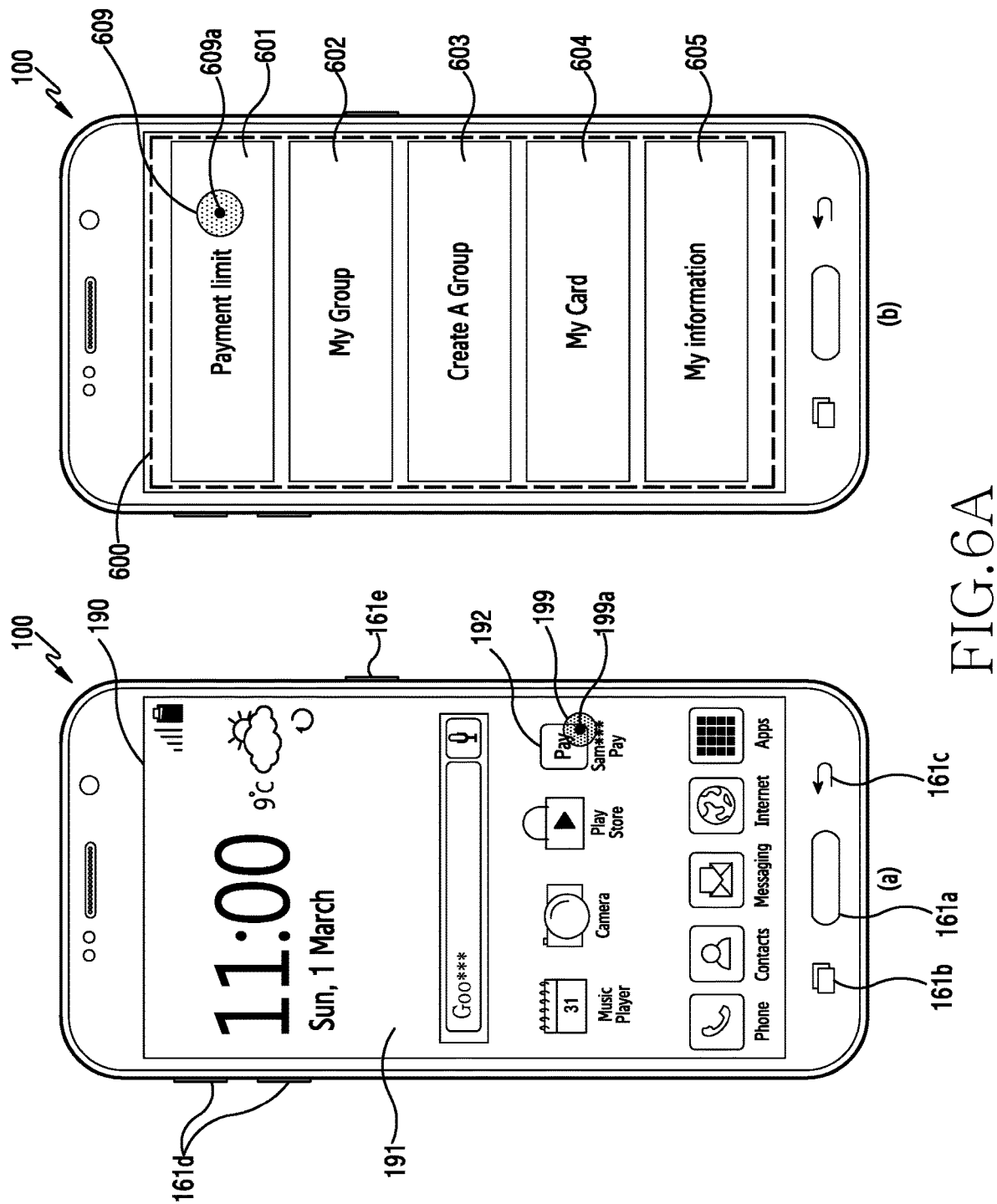
FIGS. 6A and 6B are diagrams illustrating examples of setting a payment limit and a notification in the portable device according to an example embodiment of the present disclosure.

Referring to FIGS. 1, 2, and 6A, the buttons 161 may include, for example, and without limitation, a home button 161a, a recent execution app button 161b, and/or a back button 161c located on a lower part of the front surface of the portable device 100. The buttons 161 may include one or a plurality of volume buttons 161d and a power/lock button 161e located on the side surface of the portable device 100. Further, the buttons 161 of the portable device 100 may include only the home button 161a, the volume button 161d, the power/lock button 161e.

The buttons 161 may be implemented as touch buttons as well as physical buttons. Further, the buttons 161 of the portable device 100 may be displayed on the touch screen 190 in a text, image, and/or icon form.

The controller 110 may receive an electrical signal transmitted from the button 161 based on a user input. The controller 110 may detect a user input based on the received signal (for example, press of the button 161 or a contact of the button 161).

Shapes, locations, functions, and names of the buttons 161 illustrated in FIGS. 1 and 2 are examples for description, and modifications, transforms, and modifications may be easily understood by those skilled in the art without being limited thereto.

The microphone 162 receives a voice or a sound from the outside and generates an electrical signal under a control of the controller 110. The electrical signal generated by the microphone 162 may be converted by the audio CODEC and stored in the storage unit 175 or output through the speaker 163 under a control of the controller 110.

Referring to FIGS. 1 and 2, one or more microphones 162 may be located on the front surface, the side surface, and/or the rear surface of the portable device 100. Further, one or more microphones may be located only on the side surface of the portable device 100.

The speaker 163 may output sounds corresponding to various signals (for example, a wireless signal, a broadcasting signal, an audio source, a video file, and taking a picture) decoded by the audio CODEC under a control of the controller 110.

Referring to FIGS. 1 and 2, one or a plurality of speakers 163 may be located on the front surface, the side surface, and/or the rear surface of the portable device 100. Further, a plurality of speakers (not shown) may be located on the side surface of the portable device 100.

According to an example embodiment of the present disclosure, the speaker 163 may output auditory feedback corresponding to at least one of reception of advance payment information and excess of the payment limit. For example, the speaker 163 may output the auditory feedback corresponding to a payment approval of the card used in common under a control of the controller 110.

The vibration motor 164 may convert an electrical signal into mechanical vibration under a control of the controller 110. The vibration motor 164 may include a linear vibration motor, a bar type vibration motor, a coin type vibration motor, or a piezoelectric element vibration motor.

One or more vibration motors 164 may be located in the portable device 100. Further, the vibration motor 164 may vibrate the whole portable device 100 or locally vibrate only some of the portable device 100.

According to an example embodiment of the present disclosure, the vibration motor 164 may output tactile feedback corresponding to at least one of reception of advance payment information and excess of the payment limit. Further, the vibration motor 164 may provide various tactile feedbacks (for example, a vibration strength and a vibration duration time) pre-stored or received from the outside based on a control command of the controller 110.

The connector 165 may be used as an interface for connecting the portable device 100 and an external device (not shown) or a power source (not shown). The connector 165 may include a micro USB type connector or a USB-C type connector.

The portable device 100 may transmit data (for example, corresponding to a content) stored in the storage unit 175 to the outside or receive data (for example, corresponding to a content) from the outside through a cable connected to the connector 165 under a control of the controller 110. The portable device 100 may receive power from a power source (not shown) through a wired cable connected to the connector 165 or charge a battery 185 under a control of the controller 110.

The keypad 166 may receive a user's button (or key) input to control the portable device 100. The keypad 166 may include one of a virtual keypad (not shown) displayed within the touch screen 190 and a physical keypad (not shown) formed on a part of the front surface (for example, a part including the touch screen 190) of the portable device 100. Further, the keypad 166 may further include a separate keypad (not shown) which can be connected wirelessly (for example, using short range communication) or through a wire.

The input pen 167 may be inserted into/withdrawn from the portable device 100 and may select (or touch) objects (for example, a menu, text, an image (or an electronic card), a video, a figure, an icon, and a short-cut icon) included (or displayed) on a screen (for example, a memo screen, a notepad screen, or a calendar screen) displayed on the touch screen 190 of the portable device 100 or in a handwriting/drawing application of the touch screen 190 of the portable device 100 by the user and/or contents (for example, a text file, an image file, an audio file, a video file, payment information, or a webpage), or may perform handwriting or drawing (painting or sketching).

The sensor unit 170 may detect a status of the portable device 100 and/or a condition around the portable device 100. The sensor unit 170 may include one or a plurality of sensors. The sensor unit 170 may include a proximity sensor 171 for detecting whether the user approaches the portable device 100, an illuminance sensor 172 for detecting an amount of ambient light around the portable device 100, and/or a fingerprint sensor 173 for scanning for a user's fingerprint.

The fingerprint sensor 173 may be located on one of the home button 161a provided on the front surface of the portable device 100 and a separate button (not shown) provided on the rear surface of the portable device 100. Further, the fingerprint sensor 173 may scan for a user's fingerprint through a partial area (for example, an area adjacent to the home button 161a, not shown) of the touch screen 190 of the portable device 100.

The sensor unit 170 may include an acceleration sensor (not shown), a gyro sensor (not shown), a gravity sensor (not shown), or an altimeter (not shown). Further, the sensor unit 170 may further include a biometric signal sensor (not shown) including a heartbeat sensor (not shown).

At least one sensor included in the sensor unit 170 may detect the user and the status of the portable device 100, generate an electrical signal corresponding to the detection, and transmit the generated signal to the controller 110. It is easily understood by those skilled in the art that the sensors included in the sensor unit 170 can be added, changed, or deleted according to the performance of the portable device 100.

The storage 175 may store signals or data input/output in accordance with operations of the communication unit 120 or 130, the multimedia unit 140, the camera 150, the positioning information receiver 155, the input/output unit 160, the sensor unit 170, and the touch screen 190 under a control of the controller 110. The storage unit 175 may store a Graphical User Interface (GUI) related to a control program for the control of the portable device 100 or the controller 110 and an application provided from a manufacturer or downloaded from the outside, images for providing the GUI, user information, documents, databases, or relevant data.

The storage 175 may store visual feedback (for example, a video source) that can be output according to at least one of reception of advance payment information and excess of the payment limit and recognized by the user, auditory feedback (for example, a sound source) which can be output from the speaker 163 and recognized by the user, and tactile feedback (for example, a haptic pattern) which can be output from the vibration motor 164 and recognized by the user.

The storage 175 may store a feedback provision time (for example, 500 ms) of the feedback provided to the user.

According to an example embodiment of the present disclosure, the term "storage unit" includes the storage 175, the ROM 112 and the RAM 113 within the controller 110, or a memory card (not shown) (for example, a micro SD card or a memory stick) installed in the portable device 100. The storage 175 may include, for example, and without limitation, a non-volatile memory, a volatile memory, a Hard Disk Drive (HDD), or a Solid State Drive (SSD).

The power supply 180 may supply power to the elements 110 to 195 of the portable device 100 under a control of the controller 110. The power supply 180 may supply power, which is input from an external power source (not shown) through a wired cable (not shown) connected to the connector 165, to each element of the portable device 100 under a control of the controller 110.

The power supply 180 may charge one or more batteries 185 under control of the controller 110.

The power supply 180 may supply power charged in the battery 185 to the accessory device 200 through a wired cable. Further, the power supply unit 180 may wirelessly charge another device (for example, another portable device 100 or the accessory device 200) by using a separate transmission coil (not shown) connected to the battery 185 under a control of the controller 110. A wireless charging scheme may include, for example, a magnetic resonant scheme, an electromagnetic wave scheme, or a magnetic induction scheme.

The touch screen 190 may provide a Graphical User Interface (GUI) corresponding to various services (for example, a voice call, video call, data transmission, broadcast reception, photo shoot, video view, or mobile payment) to the user. The touch screen 190 includes a touch panel (not shown) for receiving a user input (for example, a touch) and a display panel (not shown) for displaying a screen. Further, the touch screen 190 may include an edge touch panel (not shown) for receiving a user input (for example, a touch) and an edge display panel (not shown) for displaying a screen.

The touch screen 190 may transmit an analog signal corresponding to a single touch or a multi-touch input through the home screen 191 or the GUI to the touch screen controller 195. The touch screen 190 may receive the single touch or the multi-touch through a user's body (for example, fingers including the thumb) or the input pen 167.

The touch screen 190 according to an example embodiment of the present disclosure may output visual feedback corresponding to at least one of reception of advance payment information and excess (e.g., exceeding) of the payment limit. Further, the touch screen 190 may display a notification corresponding to the excess of the payment limit under a control of the controller 110. According to an example embodiment of the present disclosure, a display unit may include the touch screen 190.

The touch screen controller 195 converts an analog signal corresponding to a single touch or a multi-touch received from the touch screen 190 into a digital signal and transmits the converted digital signal to the controller 110. The controller 110 may calculate an X coordinate and a Y coordinate corresponding to a touch location of the touch input into the touch screen 190 based on the digital signal received from the touch screen controller 195.

The controller 110 may control the touch screen 190 using the digital signal received from the touch screen controller 195. For example, the controller 110 may display a short-cut icon displayed on the touch screen 190 to be distinguished from other short-cut icons based on an input touch or execute an application (for example, a payment application) corresponding to the selected short-cut icon and display a payment application screen on the touch screen 190.

The portable device 100 illustrated in FIGS. 1 and 2 includes one touch screen, but may include a plurality of touch screens. Each touch screen may be located in each housing (not shown) and the housings (not shown) may be connected to each other through one or a plurality of hinges (not shown).

A plurality of touch screens disposed on the top/bottom or the left/right may be located on the front surface of one housing (not shown). The plurality of touch screens may be implemented by one display panel and a plurality of touch panels. The plurality of touch screens may be implemented to correspond to a plurality of display panels. Further, the plurality of touch screens may be implemented by a plurality of touch panels corresponding to a plurality of display panels.

It is easily understood by those skilled in the art that at least one element can be added to, deleted, or changed from the elements of the portable device 100 illustrated in FIGS. 1 to 2 according to the performance of the portable device 100.

Referring to FIGS. 1 and 2, the wearable device 200 may be substantially similar (for example, a device difference) to the portable device 100. The elements 110 to 195 of the portable device 100 may be substantially similar to elements (not shown) of the wearable device 200. For example, a controller (not shown), a communication unit (not shown), a multimedia unit (not shown), a camera (not shown), a positioning information receiver (not shown), an input/output unit (not shown), a sensor unit (not shown), a storage unit (not shown), a power supply unit (not shown), and a battery (not shown) of the wearable device 200 may be substantially similar to the controller 110, the communication unit 120 or 130, the multimedia unit 140, the camera 150, the positioning information receiver 155, the input/output unit 160, the sensor unit 170, the storage 175, the power supply 180, and the battery 185 of the portable device 100.

A touch screen (not shown) and a touch screen controller (not shown) of the wearable device 200 may be substantially similar to the touch screen 190 and the touch screen controller 195 of the portable device 100.

It may be easily understood by those skilled in the art that at least one of the elements of the wearable device 200 illustrated in FIGS. 1 and 2 can be added, deleted, or changed according to the performance of the wearable device 200.

Figure 3:
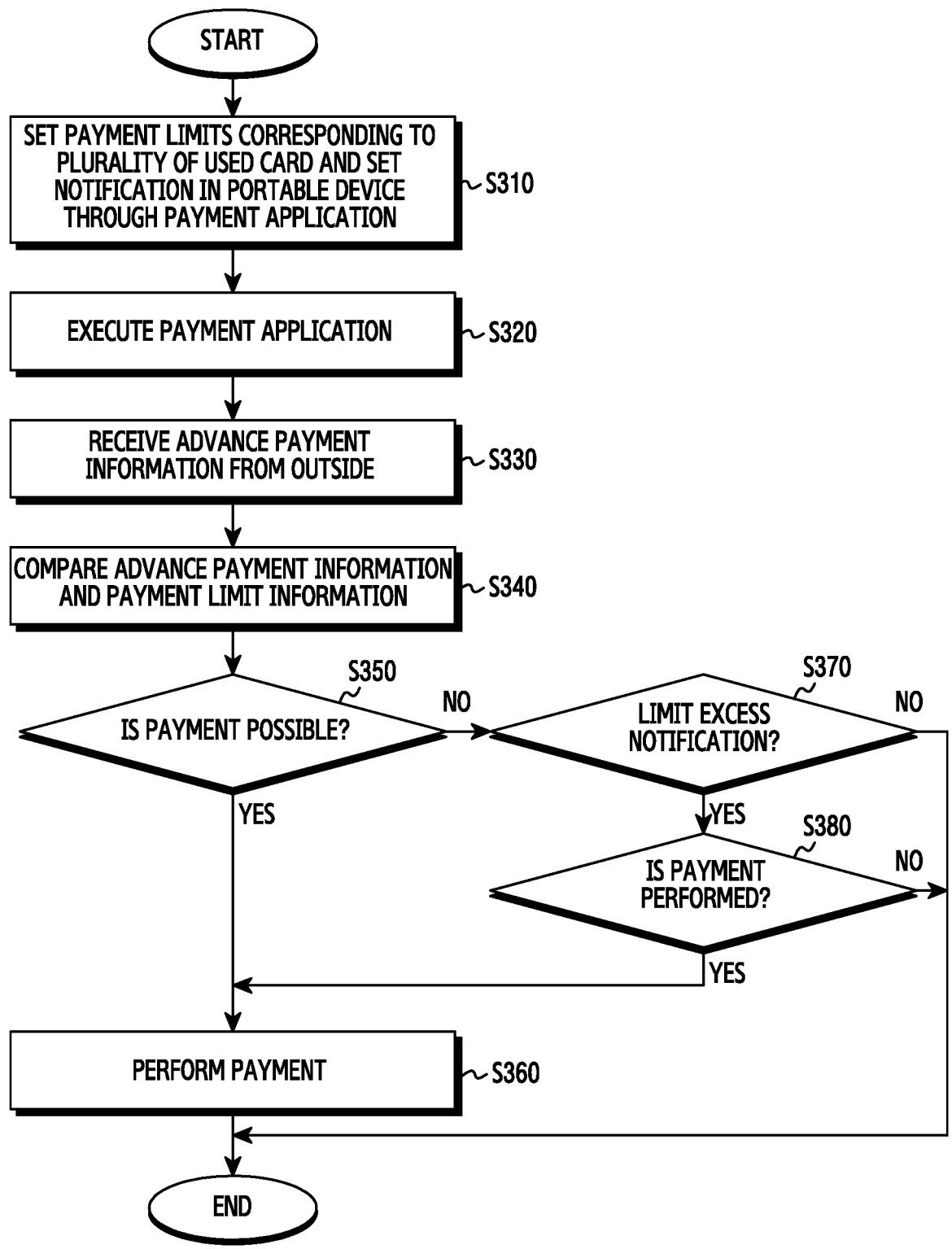
FIG. 3 is a flowchart illustrating an example electronic payment method of the portable device according to an embodiment of the present disclosure.

FIG. 3 is a flowchart illustrating an example electronic payment method of the portable device according to an example embodiment of the present disclosure.

Figure 4:
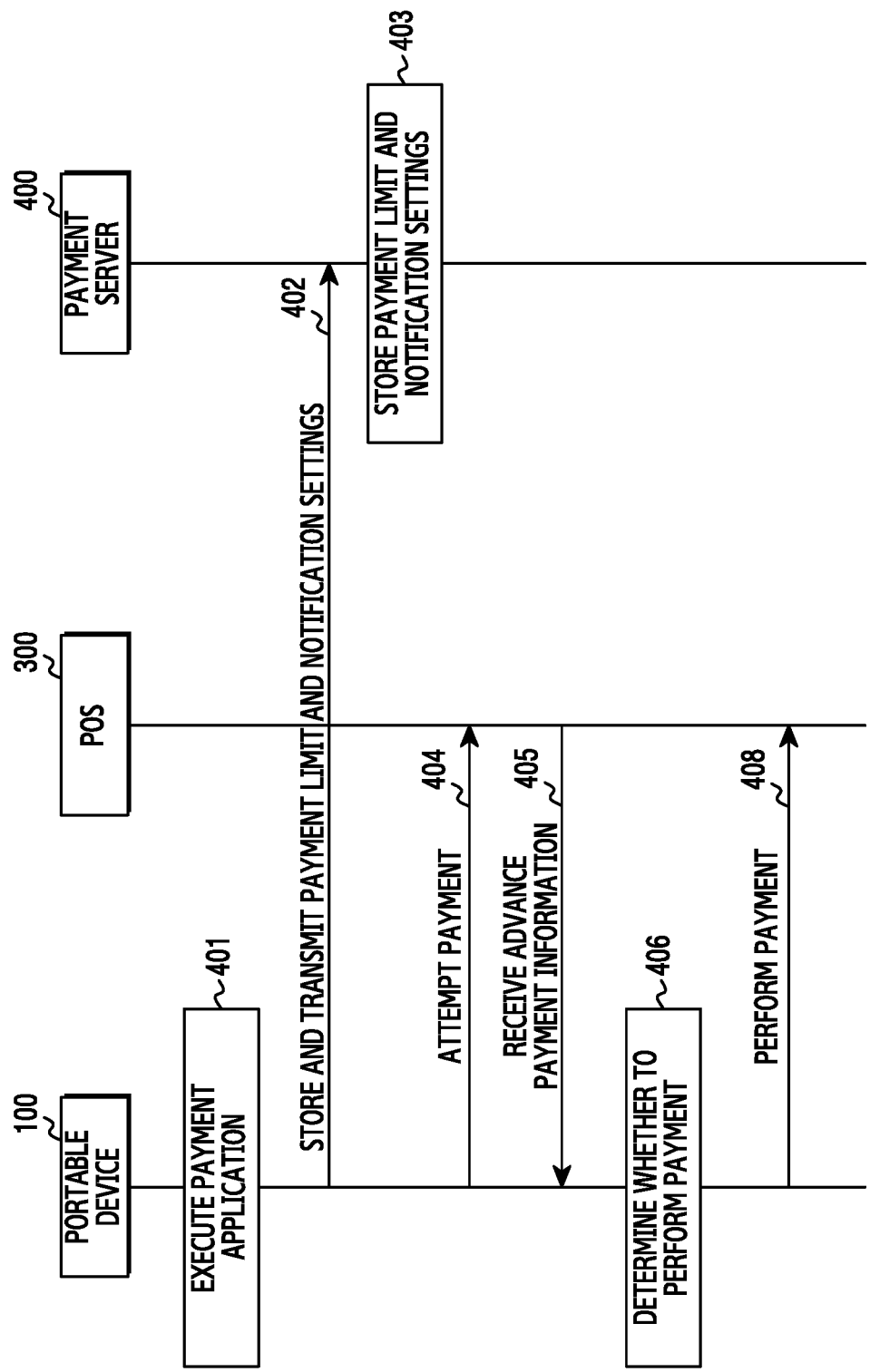
FIG. 4 is a sequence diagram illustrating an example electronic payment method of the portable device according to an example embodiment of the present disclosure.

FIG. 4 is a sequence diagram illustrating an example electronic payment method of the portable device according to an example embodiment of the present disclosure.

Figure 6B:
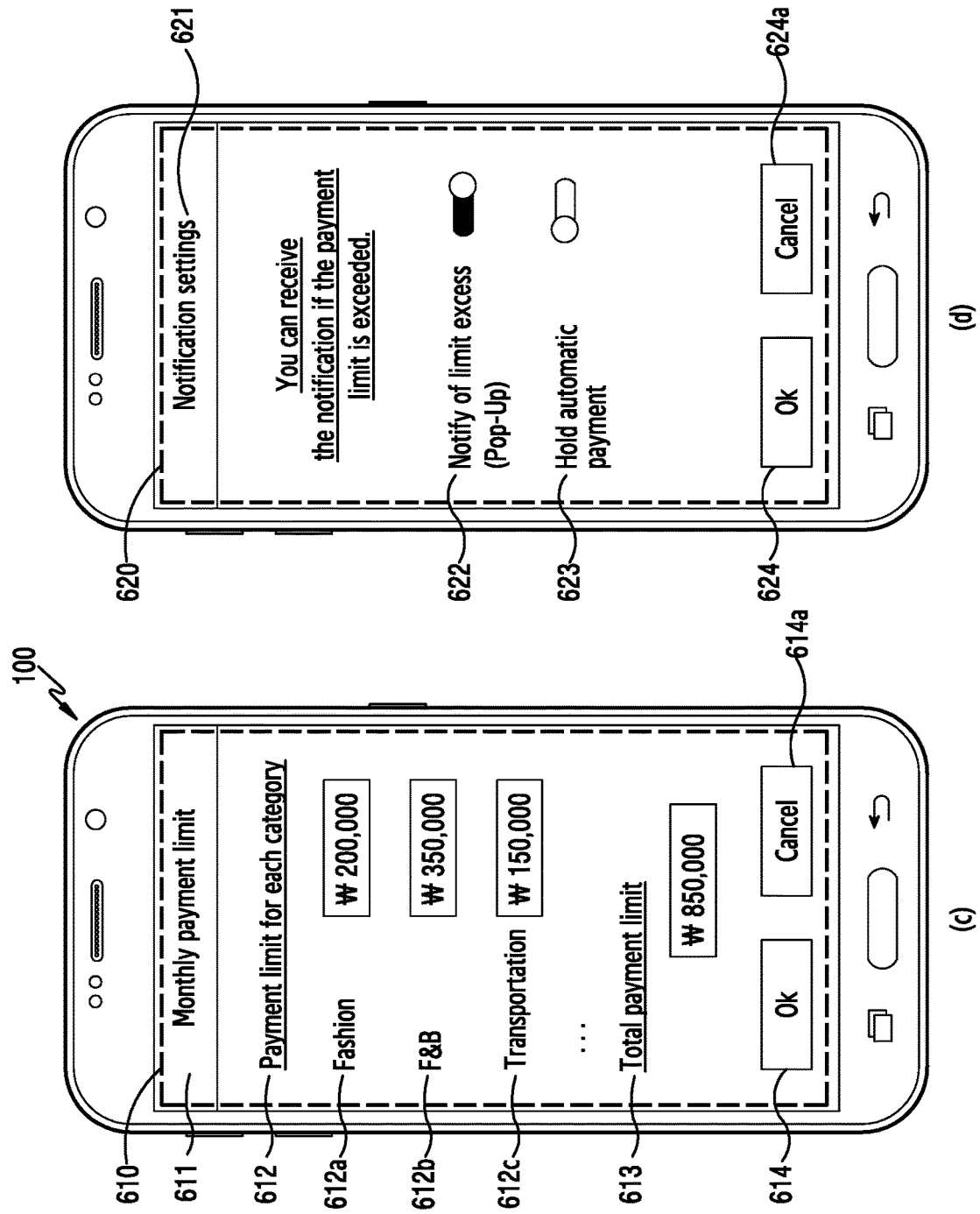

FIGS. 6A and 6B are diagrams illustrating examples of setting a payment limit and a notification in the portable device according to an example embodiment of the present disclosure.

In step S310 of FIG. 3, payment limits and notifications corresponding to a plurality of used cards may be set in the portable device through a payment application.

Step S310 of FIG. 3 will be described in detail with reference to FIGS. 4, 6A, and 6B.

In FIG. 4, the payment application is executed in the portable device 100 in step 401 as discussed below with reference to FIG. 6A(a), for example.

Referring to FIG. 6A, the portable device 100 that may add a new member of a common use group may receive a first user input 199 (for example, a touch (or a touch gesture)) on a short-cut icon 192 corresponding to the payment application (or the electronic payment application) on the home screen 191 of the touch screen 190.

The controller 110 of the portable device 100 may detect the first user input 199 using the touch screen 190 and the touch screen controller 195. The controller 110 may calculate a first user input location 199a (for example, an X1 coordinate and a Y1 coordinate) corresponding to the first user input 199 by using an electrical signal received from the touch screen controller 195.

The controller 110 may execute the payment application corresponding to the first user input 199.

Referring to FIG. 6A(b), a payment application screen 600 may be displayed on the touch screen 190 under a control of the controller 110.

The payment application screen 600 may be one of a plurality of screens provided by the payment application executed according to the first user input 199. The payment application screen 600 may be a first screen (or a basic screen) of the payment application executed according to the first user input 199. Further, the payment application screen 600 may be a screen displayed by one or a plurality of additional user inputs (not shown) on the first screen (or the basic screen) of the payment application executed according to the first user input 199.

In FIG. 4, the portable device 100 stores the set payment limit and notification and makes a request for setting the payment limit and the notification to the payment server 400 in step 402.

Referring to FIG. 6A(b), a second user input 609 (for example, a touch) may be received on the "payment limit" item 601 corresponding to one of the items (for example, menus) displayed on the payment application screen 600. Other items of the displayed items may include "my group" 602, "create A group" 603, "my card" 604, or "my information" 605. It may be easily understood by those skilled in the art that the items displayed on the payment application screen 600 may be added, changed, or deleted according to functions provided by the payment application.

The controller 110 may detect the second user input 609 by using the touch screen 190 and the touch screen controller 195. The controller 110 may calculate a second user input location 609a (for example, an X2 coordinate and a Y2 coordinate) corresponding to the second user input 609 based on an electrical signal received from the touch screen controller 195.

The controller 110 may display a "payment limit and notification setting screen" 610 corresponding to the second user input 609.

Referring to FIG. 6B(c), the controller 110 may display the payment limit setting screen 610 on the touch screen 190 in accordance with the second user input 609.

On the payment limit setting screen 610, a screen name 611 (for example, a "monthly payment limit"), a specific payment limit for each category 612 (category) corresponding to a product (or a service), a fashion 612a, food & beverage 612b, a transportation expense 612c, and a total payment limit 613 may be displayed. According to an example embodiment of the present disclosure, the product (or service) may include an item which can be purchased (or paid) by the electronic card of the user.

According to an example embodiment of the present disclosure, the payment limit may have include an amount of the payment limit. The excess of the payment limit may refer, for example, to an accumulated payment amount including an expected payment amount of an item to be purchased in one category including the item to be purchased (or paid) among the plurality of categories (for example, categories 612a to 612c or more) exceeds the set payment limit amount.

It may be easily understood by those skilled in the art that the items 612a to 613 displayed on the payment limit setting screen 610 can be added (for example, shopping, not shown), changed (for example, food & beverage, not shown), or deleted (for example, transportation expense, not shown) according to categories provided by the payment application.

The payment limit setting screen 610 may be a screen corresponding to day, week, quarter, and/or year as well as a screen corresponding to the aforementioned monthly payment limit.

The payment limit setting screen 610 may be a screen corresponding to day, week, quarter, and/or year of one card as well as a screen corresponding to the monthly payment limit of one card.

The payment limit setting screen 610 may be a screen corresponding to day, week, quarter, and/or year of each of a plurality of cards as well as a screen corresponding to the monthly payment limit of one card. Further, the payment limit setting screen 610 may be a screen corresponding to day, week, quarter, and/or year of a plurality of cards having their own priorities as well as a screen corresponding to the monthly payment limit of one card.

The user may directly input the payment limit amount into the items 612a to 613 of the payment limit setting screen 610 or select the payment limit amount. For example, the user may input ₩ 200,000 into the fashion 612a, ₩ 350,000 into the food & beverage 612b, ₩ 150,000, and ₩ 850,000 into the total payment limit 613. The user may input the payment limit amount into the items that are not displayed. A difference between the sum of the displayed items 612a to 612c and the total payment limit 613 may be caused from the items that are not displayed.

The user may input the amount into the payment limit setting screen 610, and may select ok 614 or cancel 614a.

The amount input onto the payment limit setting screen 610 may be stored in the storage 175 as payment limit information of the payment application under a control of the controller 110. Further, the amount input onto the payment limit setting screen 610 may be transmitted to the payment server 400 through the communication unit as payment limit information of the payment application under a control of the controller 110.

According to an example embodiment of the present disclosure, information including the payment limit amount may be considered as the payment limit information. The payment limit information may further include the accumulated payment amount for each category as well as the payment limit amount for each category. Information including the payment limit amount and the total payment limit amount according to a category deserves to be considered as the payment limit information.

When the accumulated payment amount for each category exceeds the payment limit amount for each category, a notification corresponding to the excess of the payment limit may be displayed.

Referring to FIG. 6B(d), the controller 110 may display a notification setting screen 620 according to the selection of ok 614 by the user. It may be easily understood by those skilled in the art that items 622 and 623 displayed on the notification setting screen 620 can be added (for example, payment limit change, not shown), changed (for example, a voice instead of popup, not shown), or deleted according to notification settings provided by the payment application.

On the notification screen 620, a screen name 621 (for example, "notification setting"), a payment limit excess notification 622 (payment limit exceed) through pop-up, and automatic payment hold 623 (payment stop) may be displayed. The user may select on/off for each of the items 622 and 623 of the notification setting screen 620.

When the item 622 or 623 of the notification setting screen 620 is on, advance payment information for receiving the limit excess notification or the payment stop notification may be displayed on the touch screen 190 under a control of the controller 110.

The user may input one of on and off onto the aforementioned notification setting screen 620 and select ok 624 or cancel 624*a*.

Whether to input on or off onto the notification setting screen 620 may be stored in the storage 175 as notification setting information of the payment application under a control of the controller 110. Further, whether to input on or off onto the notification setting screen 620 may be transmitted to the payment server 400 through the communication unit as limit information of the payment application under a control of the controller 110.

In FIG. 4, the payment server 400 stores the received payment limit information and notification setting information in step 403.

The payment server 400 may receive the payment limit information and the notification setting information transmitted from the portable device 100 through the communication unit. A controller (not shown) of the payment server 400 may store the received payment limit information in a storage unit (not shown). Further, the controller (not shown) of the payment server 400 may store the received payment limit information and notification setting information in the storage unit (not shown).

The controller (not shown) of the payment server 400 may be synchronized with the portable device 100 through the received payment limit information. The controller (not shown) of the payment server 400 may be synchronized with the portable device 100 through the received payment limit information and notification setting information.

The controller (not shown) of the payment server 400 may determine whether the user's card exceeds the payment limit based on the received (or stored) payment limit information. The controller (not shown) of the payment server 400 may determine whether the user's card exceeds the payment limit based on the received (or stored) payment limit information and the advance payment information received from the outside of the payment server 400.

Figure 7A:
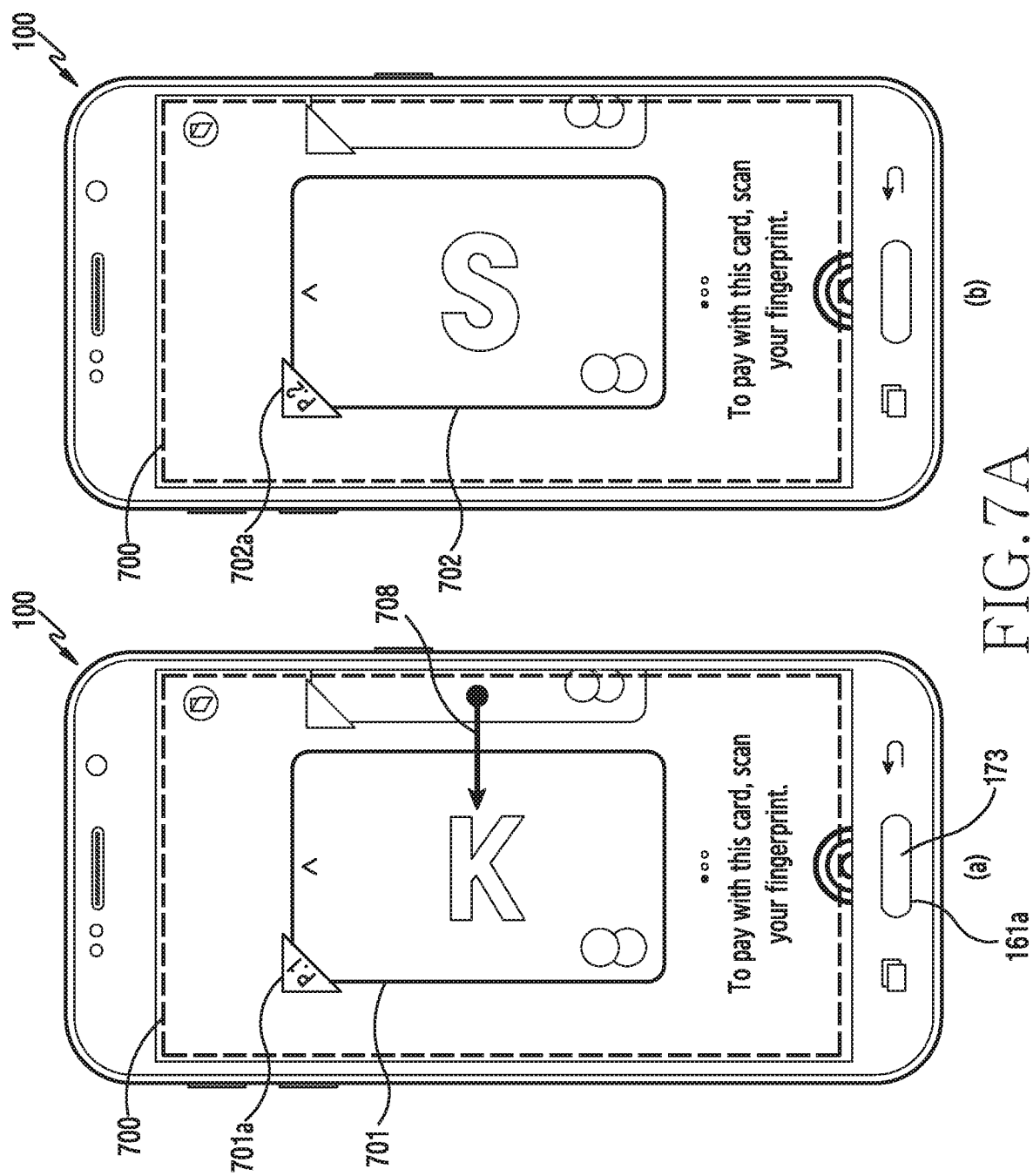
FIGS. 7A, 7B and 7C are diagrams illustrating examples of an electronic payment method of the portable device according to an example embodiment of the present disclosure.
Figure 7B:
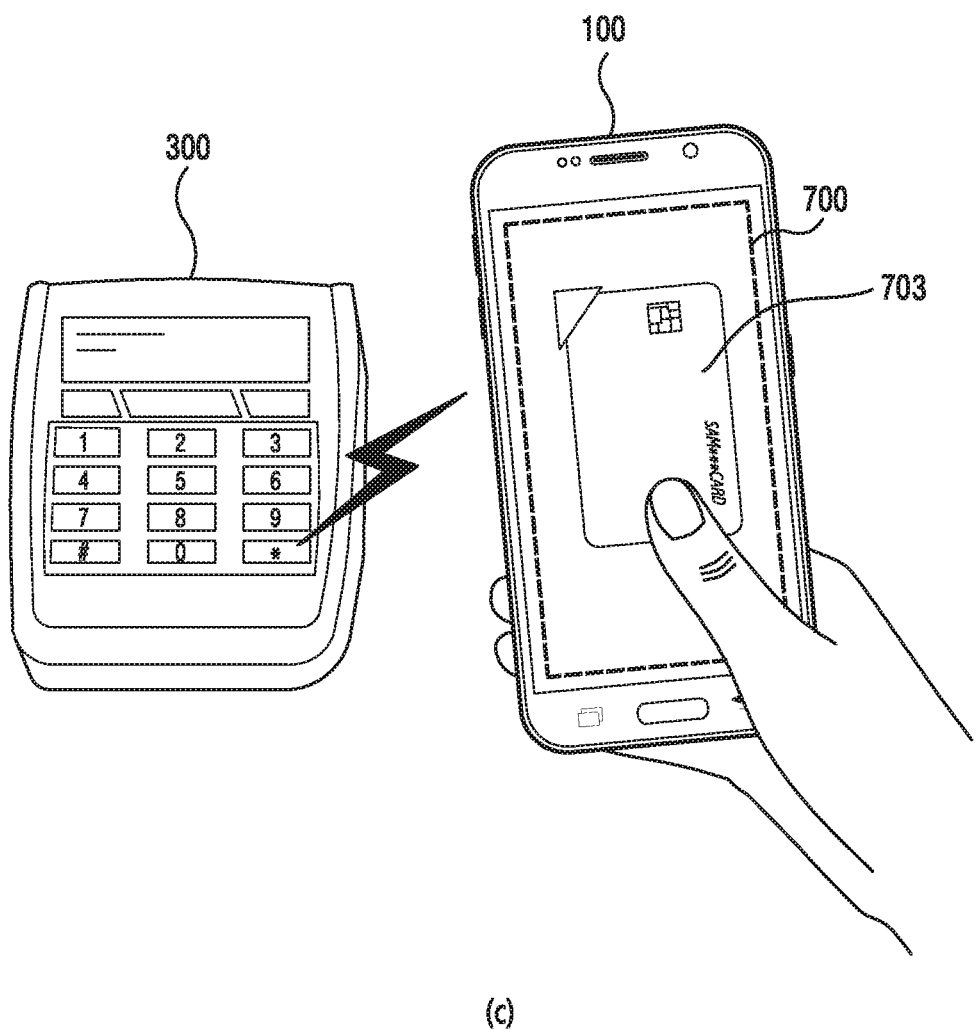
Figure 7C:
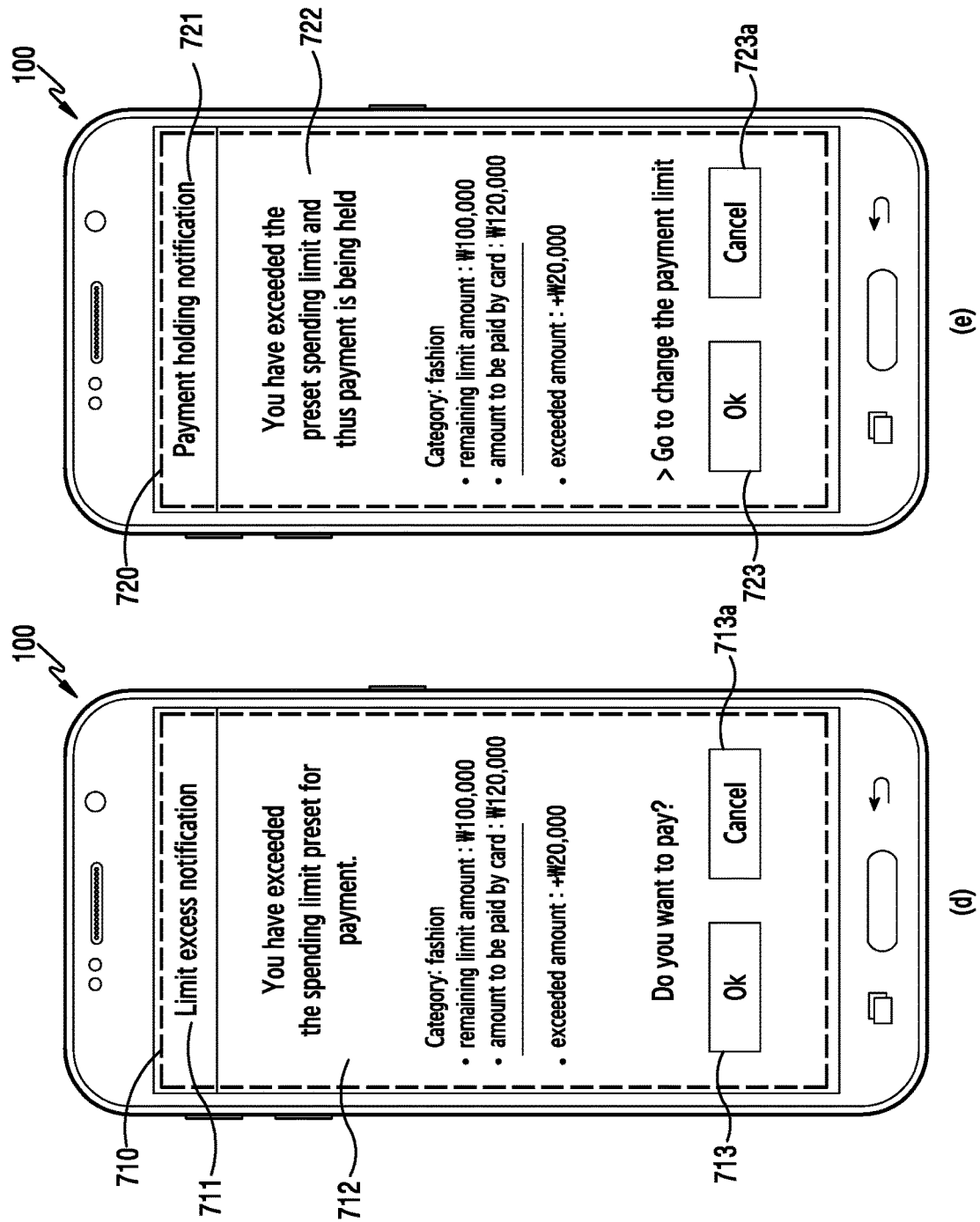

FIGS. 7A, 7B and 7C are diagrams illustrating examples of an electronic payment method of the portable device according to an example embodiment of the present disclosure.

In step S320 of FIG. 3, the payment application is executed.

Step S320 of FIG. 3 is described with reference to FIGS. 4 to 7A.

In FIG. 4, the payment is attempted using the portable device 100 in step 404.

Referring to FIGS. 7A(a) and 7A(b), the payment application is executed by the user.

The user may select an electronic card to pay for a product (or a service) in an offline shop (for example, a store or a restaurant). For example, the user may purchase pants (for ₩ 120,000) in a shopping mall.

Further, the user may select an electronic card to pay for a product (or a service) in an online shop (for example, an Internet shopping mall). The user may purchase pants (for ₩ 120,000) in an Internet shopping mall Product/price information of the product (or service) purchased by the user may be input into the card payment terminal 300 directly by a seller or may be input into the card payment terminal 300 through a barcode scan or RF Identification (RFID) tagging. The input product/price information may include at least one or more of a product name (description), an amount, a surtax (value added tax), and a total amount. The card payment terminal 300 may classify categories included in the payment limit information by using the product name. The classified categories may be included in advance payment information described below.

The portable device 100 may execute the payment application by a touch gesture (for example, a swipe or flick) input from the home button 161*a* to the touch screen 190. Further, the portable device 100 may perform a user authentication (for example, a fingerprint scan through the fingerprint sensor 173 of the home button 161*a*) to execute the payment application.

Referring to FIGS. 7A(a) and 7A(b), a payment application screen 700 is displayed in the portable device 100. One or a plurality of electronic cards may be displayed on the payment application screen 700.

An electronic card first displayed on the payment application screen 700 may include an electronic card finally used in a previously executed payment application, a user preference card (for example, an electronic card first displayed when the payment application is executed, an electronic card having a high priority, or a frequently used electronic card), or an electronic card executed in accordance with account information (or a membership card corresponding to point saving) provided in the shop. An electronic card 701 first displayed on the payment application screen 700 may be a card set by the user. The displayed card 701 set by the user may include a visual tag 701*a* corresponding to a priority. A detailed description of the priority will be made through FIG. 8 below.

The user may select the electronic card 701 through a touch gesture 708 (for example, a swipe or flick) or a touch (not shown). The touch gesture 708 may be detected from the left to the light or from the right to the left. The touch gesture is one example and may include various touch gestures (for example, a rotation or a double tap). Further, the touch gesture may be a single-finger touch gesture or a multi-finger touch gesture.

Referring to FIG. 7A(b), an electronic card 702 corresponding to the user's touch gesture 708 may be displayed. The displayed electronic card 702 may include a visual tag 702*a* corresponding to a priority. The visual tags 701*a* and 702*a* may be text, images, icons, or symbols. The visual tags 701*a* and 702*a* may be located within the electronic cards 701 and 702 or extrude to the outside of the electronic cards 701 and 702. Shapes of the visual tags 701*a* and 702*a* may include polygons such as a circle, an oval, and a triangle, a free shape, or a free curve.

Areas of the displayed visual tags 701*a* and 702*a* may be smaller than areas of the electronic cards 701 and 702. The visual tags 701*a* and 702*a* may be meta data corresponding to the electronic cards 701 and 702. The visual tags 701*a* and 702*a* may be meta data corresponding to payment information of the electronic cards 701 and 702. Further, the visual tags 701*a* and 702*a* may be meta data corresponding to advance payment information of the electronic cards 701 and 702.

The visual tags 701a and 702a may be keywords or terms added to the electronic cards 701 and 702. The visual tags 701a and 702a may be keywords or terms added to payment information of the electronic cards 701 and 702. Further, the visual tags 701a and 702a may be keywords or terms added to advance payment information of the electronic cards 701 and 702.

In step S330 of FIG. 3, the advance payment information is received from the outside.

In FIG. 4, the portable device 100 receives the advance payment information from the outside in step 405.

Referring to FIG. 7B, the user may perform the payment through the electronic card 703 displayed in the portable device 100 and the card payment terminal 300. The user may perform the payment through the card payment terminal 300 and the electronic card 703 displayed in the portable device 100 in a contact or a non-contact type.

The controller 110 of the portable device 100 may transmit electronic card information corresponding to the electronic card 703 to the card payment terminal 300 through short range communication. For example, when the card payment terminal 300 supports NFC among the short range communications, the controller 110 of the portable device 100 may transmit electronic card information corresponding to the electronic card 703 to the card payment terminal 300 through NFC.

When the card payment terminal 300 supports a magnetic payment (or MST communication), the controller 110 of the portable device 100 may transmit electronic card information corresponding to the electronic card 703 to the card payment terminal 300 through magnetic security transmission communication.

The electronic card information transmitted from the portable device 100 to the card payment terminal 300 through magnetic security transmission communication may be included at least one of track 1 and track 2. The electronic card information may further include additional track 3.

Track 1 may include information on a card owner including a name of the user (for example, the card owner). Track 1 may include a Primary Account Number (hereinafter, referred to as a PAN), an expiration date, a card owner's name, a service code (for example, whether an electronic chip is included or not, or an area in which an electronic card is used), and a Card Verification Value (hereinafter, referred to as a CVV). Track 1 may include token information.

Track 2 may include the PAN, the expiration date, the service code, and the CVV required for the electronic payment. Additional information (for example, whether Samsung pay can be used) may be included in track 2 by a card issuing company (for example, a card company or a bank). Track 2 may vary depending on the card issuing company (for example, the card company or the bank). Track 2 may include token information.

According to an example embodiment of the present disclosure, electronic card information in which payment limit information according to the present disclosure is set may be identified by an identifier (for example, 40 bytes or smaller) included in track 2.

Further, electronic card information that supports a card integrated-payment according to the present disclosure may be identified by an identifier (for example, 40 bytes or smaller) included in track 2.

The controller 110 of the portable device 100 may transmit electronic card information to a corresponding a one-time token for security. Further, the controller 110 of the portable device 100 may also transmit a cryptogram along with the one-time token corresponding to the electronic card information for security.

The transmission of the electronic card information to the card payment terminal 300 is merely an example embodiment, and the present disclosure is not limited thereto and it may be easily understood by those skilled in the art that the electronic card information can be transmitted through various short range communication networks.

The card payment terminal 300 may generate advance payment information based on the electronic card information, the product/price information of the product (or service), and the shop information.

The card payment terminal 300 may parse the received electronic card information. The card payment terminal 300 may parse track 1 and track 2 corresponding to the received electronic card information.

The card payment terminal 300 may determine whether the advance payment information is generated through the parsing of track 2 (for example, an identifier corresponding to the card integrated payment). When the identifier corresponding to the card integrated-payment is included in track 2, the card payment terminal 300 may determine whether the advance payment information is generated through the parsing of track 2.

The shop information may include a shop name, a corporate registration number, a representative, an address, or a phone number. Further, the shop information may include a time when the electronic card information is received. The card payment terminal 300 may classify categories corresponding to the payment limit information based on the shop information.

The card payment terminal 300 may store the generated advance payment information in a storage unit (not shown).

The card payment terminal 300 may transmit the advance payment information to the portable device 100. When the electronic card information is received from the portable device 100 through bi-directional communication, the card payment terminal 300 may transmit the advance payment information to the portable device 100 through bi-directional communication. For example, when the electronic card information is received through NFC, the card payment terminal 300 may directly transmit the advance payment information to the portable device 100 through NFC.

In a case of the card payment through an Internet browser or an application dedicated for an online shop, the portable device 100 may receive the advance payment information through an online shop server (not shown). Further, in the case of the card payment through an Internet browser or an application dedicated for an online shop, the portable device 100 may receive the advance payment information through a network between the online shop server (not shown) and the portable device 100.

When the electronic card information is received from the portable device 100 through unidirectional communication, the card payment terminal 300 may not directly transmit the advance payment information to the portable device 100 and may transmit the advance payment information to another device (for example, a card payment terminal server (a POS server or a purchase server (acquirer))). For example, when the electronic card information is received through MST communication, the card payment terminal 300 may not transmit the advance payment information to the portable device 100 through the MST communication and may transmit the advance payment information (or electronic card information corresponding to raw data required for generating the advance payment information and price information of the product (or service)) through, for example, a network between the card payment terminal 300 and another device (for example, the card payment terminal server (the POS server or the purchase server (acquirer))). For example, when the electronic card information is received through MST communication, the card payment terminal 300 may not transmit the advance payment information to the portable device 100 through the MST communication and may transmit the advance payment information (or electronic card information corresponding to raw data required for generating the advance payment information and price information of the product (or service)) through, for example, a network between the card payment terminal 300 and another device (for example, a plurality of devices among the card payment terminal server (the POS server or the purchase server), a payment network (not shown), a financial server (not shown), the token server 500, and the payment server 400). It may be easily understood by those skilled in the art that the aforementioned other devices (for example, a plurality of devices of the card payment terminal server (the POS server or the purchase server), the payment network (not shown), the financial server (not shown), the token server 500, and the payment server 400) are only one embodiment and an addition, change, or deletion can be made.

The advance payment information generated by the card payment terminal 300 may refer to holding of the card payment. The card payment terminal 300 may hold a payment approval request to the card payment terminal server (not shown) due to the generation of the advance payment information.

The portable device 100 may receive the advance payment information from the card payment terminal 300. The portable device 100 may receive the advance payment information from the outside. The portable device 100 may store the received advance payment information.

In step S340 of FIG. 3, the advance payment information and the payment limit information are compared.

The controller 110 of the portable device 100 may compare the received advance payment information and the stored payment limit information. The controller 110 of the portable device 100 may determine whether to perform the payment (for example, determine to proceed to or hold the payment).

The controller 110 may determine a category included in the payment limit information based on the received advance payment information. Further, the controller 110 may parse the category included in the received advance payment information.

The controller 110 may identify previous category payment limits of the determined category. The controller 110 may compare product/price information in the received advance payment information with the payment limit information.

In step S350 of FIG. 3, the controller determines whether to perform the payment.

In FIG. 4, the controller 110 of the portable device 100 determines whether to perform the payment based on the comparison between the advance payment information and the payment limit information in step 406.

When the payment limit of the category is not exceeded, the controller 110 proceeds to the payment. When the payment limit of the category is not exceeded, the controller 110 proceeds to step S360 of FIG. 3.

When the payment limit of the category is exceeded, the controller 110 may display a notification without performing the payment. When the payment limit of the category is exceeded, the controller 110 proceeds to step S370 of FIG. 3.

In step S360 of FIG. 3, the payment is performed.

In FIG. 4, the payment is performed in step 408.

When the payment limit of the category is not exceeded, the controller 110 may make a request for performing the payment to the card payment terminal 300. When the payment limit of the category is not exceeded, the controller 110 may re-transmit the electronic card information to the card payment terminal 300 like in step S320 of FIG. 3.

When the payment limit of the category is not exceeded, the controller 110 may not display a notification (not shown) corresponding to the non-excess of the payment limit of the category. Further, when the payment limit of the category is not exceeded, the controller 110 may display a notification (not shown) corresponding to a present condition of the payment limit of the category. For example, the notification (not shown) corresponding to the present condition of the payment limit may display a category, the remaining limit, and a card payment amount.

The card payment terminal 300 may perform the card payment in response to a request for performing the payment received from the portable device 100.

When the payment is finally approved, the card payment terminal 300 may output a sales slip.

When the payment is performed in step S360 of FIG. 3, the electronic payment method of the portable device 100 ends.

Returning to step S350 of FIG. 3, when the payment limit of the category is exceeded, step S370 of FIG. 3 is performed.

In step S370 of FIG. 3, a limit excess notification is displayed.

Referring to FIG. 7C(d), the controller 110 may display a limit excess notification screen 710.

The excess limit notification screen 710 may include a screen name 711 (for example, "limit excess notification") or a notification content 712 (description). The limit excess notification screen 710 may provide a limit excess amount to the user.

The limit excess notification screen 710 may further display ok 713 and cancel 713a to receive information on whether to perform the payment or not from the user.

In step S380 of FIG. 3, whether to perform the payment is received.

Referring to FIG. 7C(d), the user may select one of the displayed ok 713 and cancel 713a. When the user selects ok 713, step S360 of FIG. 3 is performed.

When the payment is performed in step S360 of FIG. 3, the electronic payment method of the portable device 100 ends.

Further, when the user selects cancel 713a, the electronic payment method of the portable device 100 ends.

According to another example embodiment of the present disclosure, returning to step S350 of FIG. 3, when the payment limit of the category is exceeded, a payment holding notification is displayed.

Referring to FIG. 7C(e), the controller 110 may display a payment holding notification screen 720.

The payment holding notification screen 720 may include a screen name 721 (for example, "payment holding notification") or a notification content 722 (description). The payment holding notification screen 720 may provide a limit excess amount to the user.

The limit excess notification screen 710 may further display ok 723 and cancel 723*a* to receive information on whether the user changes the payment limit or not.

Referring to FIG. 7C(e), the user may select one of the displayed ok 723 and cancel 723*a*. When the user selects ok 723, the controller 110 may display the payment limit setting screen 610 of step S310 of FIG. 3.

The user may change the amount of the fashion 612*a* in the items displayed on the payment limit setting screen 610 and re-perform the electronic payment method of the portable device 100.

Further, when the user selects cancel 723*a*, the electronic payment method of the portable device 100 ends.

Figure 5:
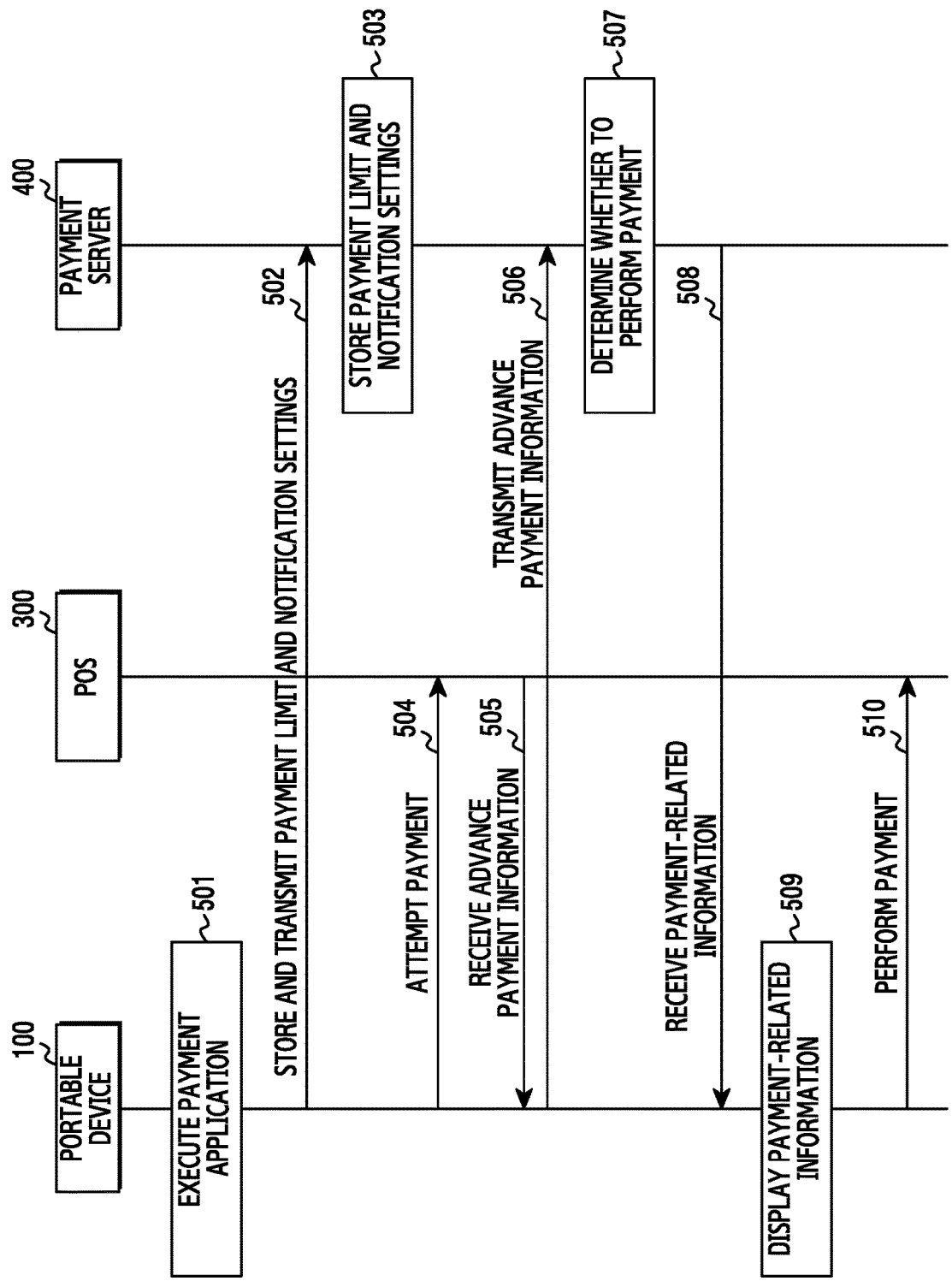
FIG. 5 is a sequence diagram illustrating an example electronic payment method of the portable device according to another example embodiment of the present disclosure.

FIG. 5 is a sequence diagram illustrating an example electronic payment method of the portable device according to another example embodiment of the present disclosure.

The electronic payment method of the portable device 100 according to the other example embodiment of the present disclosure illustrated in FIG. 5 will be described with reference to FIGS. 3 and 4.

Since steps 501 to 505 of FIG. 5 are substantially similar to steps 401 to 405 of FIG. 4, an overlapping description is omitted.

According to another example embodiment of the present disclosure, whether to perform the electronic card payment may be determined by the payment server 400 rather than the portable device 100.

In FIG. 5, the portable device 100 transmits advance payment information received from the card payment terminal 300 to the payment server 400 in step 506.

The payment server 400 may store the received advance payment information.

In FIG. 5, the payment server 400 determines whether to perform the payment in step 507.

The controller (not shown) of the payment server 400 may compare the received advance payment information and the stored payment limit information. The controller (not shown) of the payment server 400 may determine whether to perform the payment (for example, whether to perform or hold the payment).

The controller (not shown) of the payment server 400 may determine a category included in the payment limit information based on the received advance payment information. Further, the controller (not shown) of the payment server 400 may parse a category included in the received advance payment information.

The controller (not shown) of the payment server 400 may identify previous category payment limits of the determined category. The controller (not shown) of the payment server 400 may compare product/price information in the received advance payment information with the payment limit information.

The controller (not shown) of the payment server 400 may transmit payment-related information corresponding to the determined decision to the portable device 100 in step 508.

The payment-related information may include the performance of the payment of the portable device 100 corresponding to the non-excess of the payment limit of the category and the holding of the payment of the portable device 100 corresponding to the excess of the payment limit of the category.

The portable device 100 may display the payment-related information transmitted from the payment server 400 in step 509.

When the payment-related information corresponds to the excess of the payment limit of the category, the controller 110 of the portable device 100 may display the limit excess notification screen 710 corresponding to FIG. 7C(d) and the payment holding notification screen 720 corresponding to FIG. 7C(e).

Since step 510 of FIG. 5 is substantially similar to step 408 of FIG. 4, an overlapping description is omitted.

When the payment limit of the category is not exceeded, the controller 110 may make a request for performing the payment to the card payment terminal 300. When the payment limit of the category is not exceeded, the controller 110 may re-transmit electronic card information to the card payment terminal 300 like in step 320 of FIG. 3.

When the payment limit of the category is not exceeded, the controller 110 may not display a notification (not shown) corresponding to the non-excess of the payment limit of the category. Further, when the payment limit of the category is not exceeded, the controller 110 may display a notification (not shown) corresponding to a present condition of the payment limit of the category. For example, the notification (not shown) corresponding to the present condition of the payment limit may display a category, the remaining limit, and a card payment amount.

The card payment terminal 300 may perform the card payment in response to a request for performing the payment received from the portable device 100.

When the payment is finally approved, the card payment terminal 300 may output a sales slip.

When the payment is performed in step 510 of FIG. 5, the electronic payment method of the portable device 100 ends.

An electronic payment method of the portable device according to an example embodiment of the present disclosure includes: a step of executing a payment application for performing an electronic payment through a processor in a portable device including a communication unit and the processor, a step of receiving advance payment information corresponding to an item to be paid for from the outside through the communication unit, a step of comparing a category of the item, payment limit information of the category, and an accumulated payment amount of the category based on the advance payment information through the processor, and a step of performing one of payment approval and payment holding based on the payment limit information and the accumulated payment amount through the processor.

According to an example embodiment of the present disclosure, the step of performing one of the payment approval and the payment holding may include providing one of a payment limit excess notification and a payment holding notification corresponding to the payment holding when a sum of an expected payment amount of the item and the accumulated payment amount exceeds the payment limit amount.

According to an example embodiment of the present disclosure, the step of performing one of the payment approval and the payment holding may include performing the payment holding when a sum of an expected payment amount of the item and the accumulated payment amount exceeds the payment limit amount.

FIGS. 8A and 8B are diagrams illustrating an example of card integrated-payment settings in the portable device according to another example embodiment of the present disclosure.

Referring to FIG. 8A, the controller 110 may display the card integrated-payment setting screen 630 on the touch screen 190 in accordance with the second user input 609 (see FIG. 6A(b)). The controller 110 may display the card integrated-payment setting screen 630 on the touch screen 190 in accordance with the selection of ok 614 by the user (see FIG. 6B(c)). Further, the controller 110 may display the card integrated-payment setting screen 630 on the touch screen 190 in accordance with the selection of ok 624 by the user (see FIG. 6B(d)).

On the card integrated-payment setting screen 630, a screen name 631 (for example, "card integrated-payment") and a card integrated-payment limit 632 may be displayed.

The payment limit setting screen 630 may be a screen corresponding to day, week, quarter, and/or year as well as a screen corresponding to the aforementioned monthly payment limit.

The user may directly input the card integrated-payment limit amount into an item 632 of the payment limit setting screen 630 or select the card integrated-payment limit amount. Further, the card integrated-payment limit amount input (or selected) into the item 632 of the payment limit setting screen 630 may be designated as a card integrated-payment limit amount for each category (for example, similar to FIG. 6B(c), not shown). For example, ₩ 2,500,000 may be input into the card integrated-payment limit 632.

The user may input the amount onto the card integrated-payment setting screen 630 and select ok 633. Further, the user may select cancel 633a.

The amount input onto the card integrated-payment setting screen 630 may be stored in the storage 175 as the card integrated-payment limit information of the payment application under a control of the controller 110. Further, the amount input onto the card integrated-payment setting screen 630 may be transmitted to the payment server 400 through the communication unit as the card integrated-payment limit information of the payment application under a control of the controller 110.

According to an example embodiment of the present disclosure, information including limit amounts of all electronic cards possessed by the user deserves to be considered as the card integrated-payment limit information.

Referring to FIG. 8B, controller 110 may display another card integrated-payment setting screen 640 in accordance with the selection of ok 633 by the user.

On the other card integrated-payment setting screen 640, a card integrated-payment 641, a card priority 642, and miniature electronic card images 643, including 643a to 643d of all electronic cards possessed by the user may be displayed.

The other card integrated-payment setting screen 640 may be referred to as a card priority setting screen.

The user may set the priority by touching the miniature electronic card image (for example, a tap for selecting the priority) or making a touch gesture (for example, a swipe or a drag & drop for moving to a location corresponding to the priority). Indicators 643a1, 643b1, 643c1, and 643d1 of the miniature electronic cards may be changed by the touch (for example, a first tap) or the touch gesture (for example, a drag & drop to a location 643a of a first priority).

Four, corresponding to the number of miniature electronic card images 643a to 643d, is only an example embodiment, and two miniature electronic card images may be displayed if the user possesses two electronic cards. When the number of electronic cards possessed by the user is large, miniature electronic card images may be displayed on a plurality of pages.

The user may input the priorities of the electronic cards on the other card integrated-payment setting screen 640 and select ok 644 or cancel 644a.

The priorities of the electronic cards input onto the other card integrated-payment setting screen 640 may be stored in the storage unit 175 as electronic card priority information of the payment application under a control of the controller 110. Further, the priority of the electronic cards on the other card integrated-payment setting screen 640 may be transmitted to the payment server 400 through the communication unit as the priorities of the electronic cards of the payment application under a control of the controller 110.

When the payment application is executed in the portable device 100, the electronic card corresponding to the miniature electronic card image 643a of the first priority selected by the user may be first displayed on the payment application screen 700. The user may perform the payment through the card payment terminal 300 by the electronic card 643a of the first priority (for example, corresponding to steps S330 to S380 of FIG. 3).

According to another example embodiment of the present disclosure, a coupon corresponding to the card integrated-payment may be recommended to the user through the payment application of the portable device 100.

Electronic card use details may be set according to each category set in an embodiment of the present disclosure. A coupon and event (for example, a sale period, sale items, and a discount rate) setting screen (not shown) may be displayed on the payment application screen 700. The user may select on/off of a coupon item (not shown) and an event item (not shown) on the coupon and event setting screen (not shown).

A manager of an online shop or an offline shop may register coupons and/or event in a seller portal (not shown).

The payment application may provide a push notification service for the coupons and/or events registered in the seller portal (not shown) to the user.

The user may use the provided coupons for performing the card payment in the online shop or the offline shop.

The methods according to the various example embodiments of the present disclosure may be in a form of program commands executed through various computer means to be recorded in a computer readable medium. The computer readable medium may include a program command, a data file, a data structure, and the like independently or in combination. The computer readable medium may be stored, for example, in a volatile or non-volatile storage device such as a ROM, a memory such as a RAM, a memory chip, a memory device, or a memory IC, or a storage medium that is optically or magnetically recordable and simultaneously machine (for example, a computer)-readable, such as a CD, a DVD, a magnetic disk, or a magnetic tape, regardless of its ability to be erased or re-recorded.

It will be appreciated that the storage unit included in the portable device is one example of the machine-readable storage media suitable for storing a program or programs including commands for implementing various embodiments of the present disclosure. The program command recorded in the medium may be things specially designed and configured for the present disclosure, or things that are well known to and can be used by those skilled in the computer software related art.

As described above, various example embodiments of the present disclosure may provide a portable device and an electronic payment method of a portable device capable of setting a payment limit for each category of products (or services) in one electronic cards possessed by the user. Example embodiments of the present disclosure may provide a portable device and an electronic payment method of a portable device capable of providing the user with a notification corresponding to a payment limit excess generated in a category having a payment limit of one electronic card possessed by the user. Embodiments of the present disclosure may provide a portable device and an electronic payment method of a portable device capable of collectively identifying and managing payment details of all electronic cards that are possessed by the user and have priorities. Example embodiments of the present disclosure may provide a portable device and an electronic payment method of a portable device capable of collectively identifying and managing payment details of all electronic cards possessed by the user. Without being limited thereto, various example embodiments of the present disclosure may provide a portable device and an electronic payment method of a portable device capable of performing an electronic payment through an electronic card having a payment limit for each category.

Although the present disclosure has been described with reference to various example embodiments and the drawings as described above, the present disclosure is not limited to the aforementioned example embodiments, and various modifications and alterations can be made from the descriptions by those skilled in the art to which the present disclosure pertains.

Accordingly, the scope of the present disclosure should not be determined by the above-described example embodiments, and should be determined by the following claims and their equivalents.

What is claimed is:

1. A method for performing an electronic payment by a portable device, the method comprising:
    executing, by the portable device, a payment application including an electronic card for which payment limit information is set, the payment limit information including a payment limit amount for each of a plurality of purchasing categories;
    transmitting, by the portable device, electronic card information corresponding to the electronic card to a payment terminal through wireless communication to pay for an item to be purchased with the electronic card, the electronic card information including information indicating that the payment limit is set for use by the payment terminal in generating advance payment information;
    receiving, by the portable device, the advance payment information from the payment terminal, the advance payment information including data regarding a payment amount for the item to be purchased with the electronic card and a purchasing category associated with the item, the advance payment information being generated in response to the information indicating that the payment limit is set for the electronic card;
    comparing, by the portable device, an accumulated payment amount for the purchasing category and the payment limit amount for the purchasing category associated with the item, the accumulated payment amount including the payment amount for the item to be purchased with the electronic card, and the payment limit amount being set for the electronic card;
    performing, by the portable device, one of payment approval or payment holding based on the comparing of the accumulated payment amount and the payment limit information regarding the electronic card; and
    displaying, by the portable device, one of a payment limit notification or a payment holding notification based on the accumulated payment amount for the purchasing category associated with the item exceeding the payment limit amount for the purchasing category associated with the item,
    wherein the payment limit notification is configured for receiving, by the portable device, a user input corresponding to a final approval for the payment.

2. The method of claim 1, further comprising setting, by the portable device, the payment limit information and notification setting information for a notification about exceeding a payment limit amount for the one or more purchasing categories through the payment application.

3. The method of claim 1, wherein the payment application is executed based at least on receiving, by the portable device, a user input.

4. The method of claim 1, wherein the electronic card information includes at least one of: a token or a password.

5. The method of claim 1, wherein the wireless communication includes Magnetic Secure Transmission (MST) communication, and the electronic card information is transmitted to the payment terminal through the MST communication and comprises at least one of track 1 or track 2 electronic card information.

6. The method of claim 5, wherein the information indicating that the payment limit information is set comprises information included in the track 2 electronic card information.

7. The method of claim 4, wherein the wireless communication includes a unidirectional wireless communication scheme and a bi-directional wireless communication scheme, and the advance payment information is received through at least one of the unidirectional wireless communication scheme and the bi-directional wireless communication scheme.

8. The method of claim 1, wherein the payment holding notification is configured for receiving a user input corresponding to a change in the set payment limit.

9. The method of claim 1, further comprising setting the payment limit information for a plurality of different electronic cards of a user.

10. The method of claim 9, further comprising setting the payment limit information for multiple purchasing categories for the plurality of electronic cards of the user.

11. The method of claim 9, further comprising setting priorities for the plurality of electronic cards of the user.

12. The method of claim 11, further comprising displaying the plurality of electronic cards in the executed payment application, and wherein visual tags corresponding to the priorities are displayed together with the electronic cards.

13. The method of claim 12, wherein an area of the visual tag is smaller than an area of the electronic card.

14. A portable device comprising:
    communication circuitry; and
    a processor configured to control the communication circuitry,
    wherein the processor is configured to:
        execute a payment application including an electronic card for which payment limit information is set, the payment limit information including a payment limit amount for each of a plurality of purchasing categories;
        control transmitting, via the communication circuitry, electronic card information corresponding to the electronic card to a payment terminal to pay for an item to be purchased with the electronic card, the electronic card information including information indicating that the payment limit is set for use by the payment terminal in generating advance payment information;
        control receiving, via the communication circuitry, the advance payment information from the payment terminal, the advance payment information including data regarding a payment amount for the item to be purchased with the electronic card and a purchasing category associated with the item, the advance payment information being generated in response to the information indicating that the payment limit is set for the electronic card;

compare an accumulated payment amount for the purchasing category and the payment limit amount for the purchasing category associated with the item, the accumulated payment amount including the payment amount for the item to be purchased with the electronic card, and the payment limit amount being set for the electronic card;

perform one of payment approval or payment holding based on the comparing of the accumulated payment amount and the payment limit information regarding the electronic card; and display one of a payment limit notification or a payment holding notification based on the accumulated payment amount for the purchasing category associated with the item exceeding the payment limit amount for the purchasing category associated with the item, wherein the payment limit notification is configured for receiving a user input corresponding to a final approval for the payment.

\* \* \* \* \*